US010133570B2

(12) United States Patent
Memon

(10) Patent No.: US 10,133,570 B2
(45) Date of Patent: Nov. 20, 2018

(54) PROCESSORS, METHODS, SYSTEMS, AND INSTRUCTIONS TO SELECT AND CONSOLIDATE ACTIVE DATA ELEMENTS IN A REGISTER UNDER MASK INTO A LEAST SIGNIFICANT PORTION OF RESULT, AND TO INDICATE A NUMBER OF DATA ELEMENTS CONSOLIDATED

(71) Applicant: Intel Corporation, Santa Clara, CA (US)

(72) Inventor: Mazhar I Memon, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 78 days.

(21) Appl. No.: 14/491,548

(22) Filed: Sep. 19, 2014

(65) Prior Publication Data

US 2016/0085547 A1    Mar. 24, 2016

(51) Int. Cl.
*G06F 9/30*         (2018.01)
(52) U.S. Cl.
CPC ...... *G06F 9/30018* (2013.01); *G06F 9/30032* (2013.01); *G06F 9/30036* (2013.01)
(58) Field of Classification Search
None
See application file for complete search history.

(56) References Cited

U.S. PATENT DOCUMENTS 6,052,769 A    4/2000 Huff et al.
6,446,198 B1 *  9/2002 Sazegari ............. G06F 7/764
                                              712/300
9,354,877 B2    5/2016 Toll et al.
2004/0054877 A1  3/2004 Macy, Jr. et al.
2012/0216011 A1  8/2012 Gove et al.
(Continued)

FOREIGN PATENT DOCUMENTS

JP    2003-510682 A    3/2003
JP    2014-89699 A     5/2014
(Continued)

OTHER PUBLICATIONS

Intel, "Intel Architecture Instruction Set Extensions Programming Reference", Reference No. 319433-017, Dec. 2013, 6 pages.
(Continued)

*Primary Examiner* — Jacob Petranek
(74) *Attorney, Agent, or Firm* — NDWE, LLP

(57) ABSTRACT

A processor includes packed data registers, and a decode unit to decode a data element selection and consolidation instruction. The instruction is to have a first source packed data operand that is to have a plurality of data elements, and a second source operand that is to have a plurality of mask elements. Each mask element corresponds to a different data element in the same relative position. An execution unit is coupled with the decode unit. The execution unit, in response to the instruction, is to store a result packed data operand in a destination storage location that is to be indicated by the instruction. The result packed data operand is to include all data elements of the first source packed data operand, which correspond to unmasked mask elements of the second source operand, consolidated together in a portion of the result packed data operand.

21 Claims, 18 Drawing Sheets

(56) References Cited

U.S. PATENT DOCUMENTS

| | | |
|---|---|---|
| 2012/0254589 A1 | 10/2012 | Corbal San Adrian et al. |
| 2012/0254592 A1 | 10/2012 | San Adrian et al. |
| 2013/0024654 A1* | 1/2013 | Gove ............... G06F 9/30018 712/7 |
| 2013/0212361 A1 | 8/2013 | Julier et al. |
| 2014/0019714 A1 | 1/2014 | Ould-Ahmed-Vall et al. |
| 2014/0101358 A1* | 4/2014 | Kaltenbach ......... G06F 9/30181 710/317 |
| 2014/0122831 A1* | 5/2014 | Uliel ................ G06F 15/8076 712/4 |
| 2014/0208065 A1 | 7/2014 | Ould-Ahmed-Vall et al. |
| 2014/0281396 A1 | 9/2014 | Jha |
| 2015/0039626 A1* | 2/2015 | Sen .................. G06F 17/3033 707/747 |
| 2015/0186136 A1 | 7/2015 | Uliel et al. |

FOREIGN PATENT DOCUMENTS

| | | |
|---|---|---|
| TW | 201344562 A | 11/2013 |
| TW | 201415233 A | 4/2014 |
| TW | 201435733 A | 9/2014 |
| WO | 2013/095617 A1 | 6/2013 |
| WO | 2013/101124 A1 | 7/2013 |
| WO | 2016/043908 A1 | 3/2016 |

OTHER PUBLICATIONS

International Search Report and Written Opinion received for PCT Patent Application No. PCT/US2015/045827, dated Nov. 27, 2015, 12 pages.
International Preliminary Report on Patentability and Written Opinion Received for PCT Patent Application No. PCT/US2015/045827, dated Mar. 30, 2017, 7 pages.
Office Action received for Korean Patent Application No. 10-2017-7004342, dated Sep. 30, 2017, 6 pages of Korean Office Action including 2 pages of English Translation.
Office Action and Search Report received for Taiwanese Patent Application No. 104126393, dated Dec. 21, 2016, 28 pages of Taiwanese Office Action including 15 Pages of English Translation.
Office Action received for Japanese Patent Application No. 2017-506911, dated Mar. 6, 2018, 5 pages of Japanese Office Action including 3 pages of English Translation.

* cited by examiner

DATA ELEMENT SELECTION AND
CONSOLIDATION INSTRUCTION
702A

| OPCODE | FIRST SOURCE PACKED DATA OPERAND SPECIFIER | DESTINATION SPECIFIER (OPTIONAL) | IMMEDIATE | DATA ELEMENT SIZE SPECIFIER (OPTIONAL) |
|---|---|---|---|---|
| 740A | 742A | 744A | 704 | 746A |

FIG. 7A

DATA ELEMENT SELECTION AND
CONSOLIDATION INSTRUCTION
702B

| OPCODE | FIRST SOURCE PACKED DATA OPERAND SPECIFIER | DESTINATION SPECIFIER (OPTIONAL) | PACKED DATA OPERATION MASK SPECIFIER | DATA ELEMENT SIZE SPECIFIER (OPTIONAL) |
|---|---|---|---|---|
| 740B | 742B | 744B | 748 | 746B |

FIG. 7B

DATA ELEMENT SELECTION AND
CONSOLIDATION INSTRUCTION
702C

| OPCODE | FIRST SOURCE PACKED DATA OPERAND SPECIFIER | DESTINATION SPECIFIER (OPTIONAL) | SECOND SOURCE PACKED DATA OPERAND SPECIFIER | DATA ELEMENT SIZE SPECIFIER (OPTIONAL) |
|---|---|---|---|---|
| 740C | 742C | 744C | 750 | 746C |

FIG. 7C

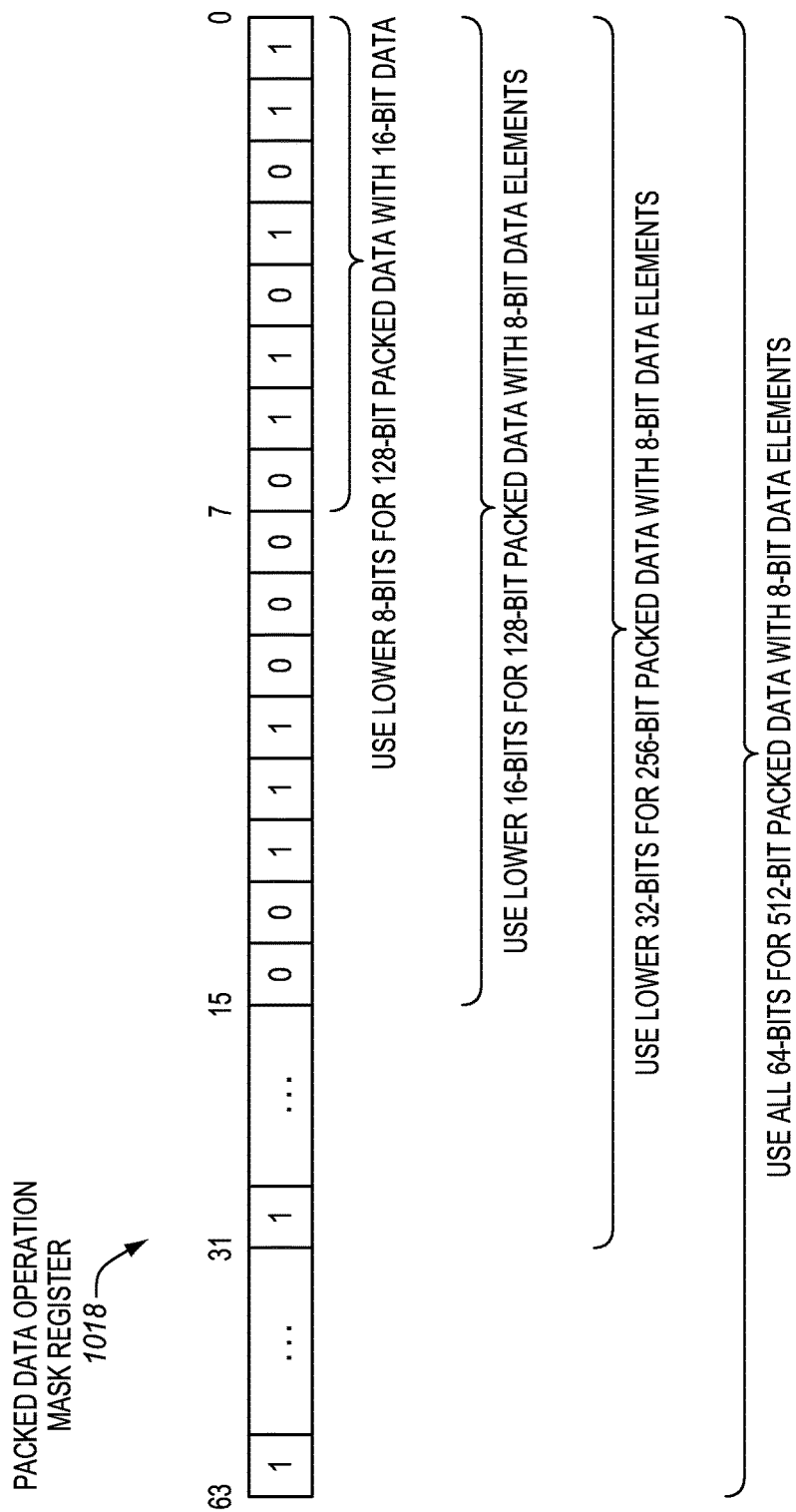

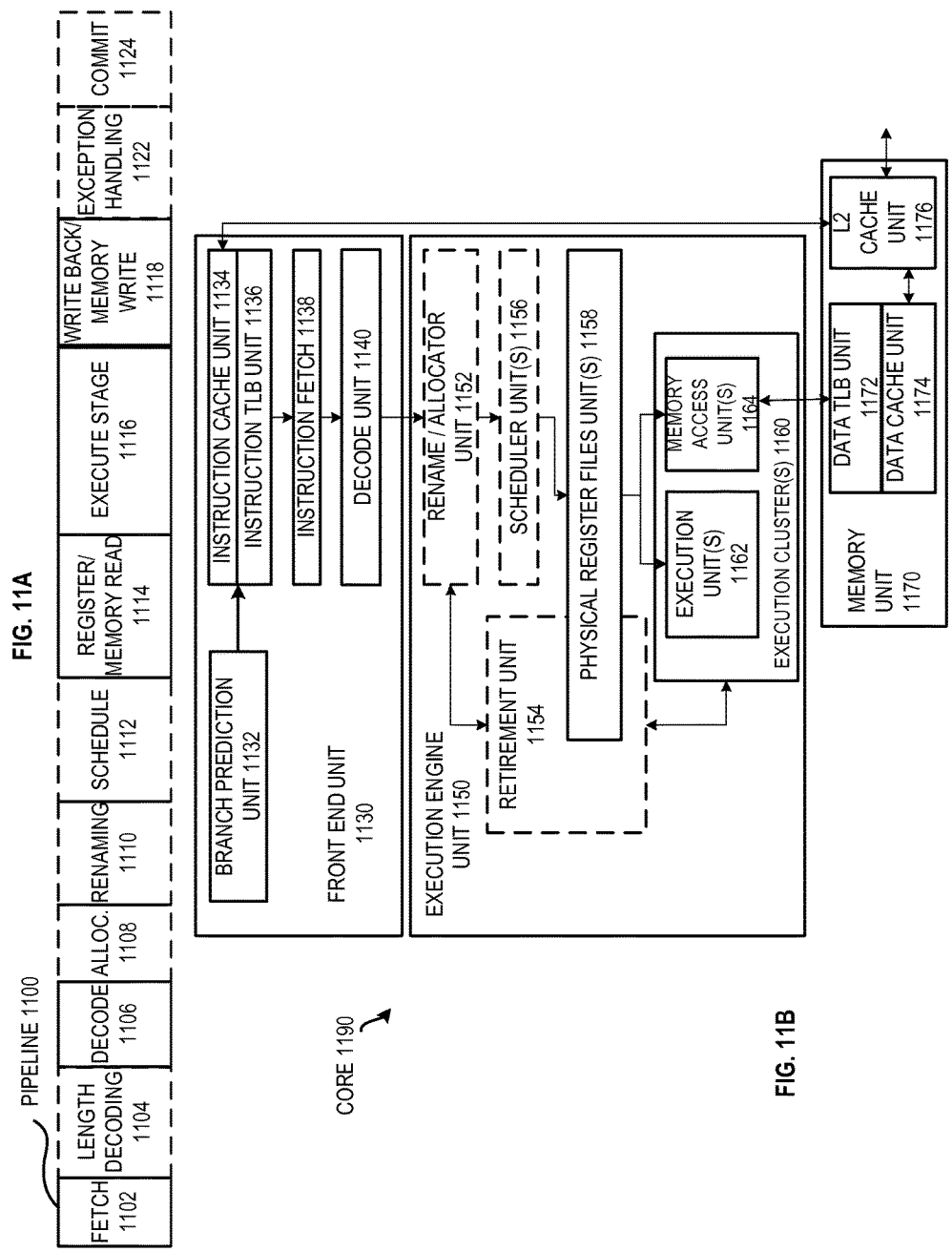

PROCESSORS, METHODS, SYSTEMS, AND INSTRUCTIONS TO SELECT AND CONSOLIDATE ACTIVE DATA ELEMENTS IN A REGISTER UNDER MASK INTO A LEAST SIGNIFICANT PORTION OF RESULT, AND TO INDICATE A NUMBER OF DATA ELEMENTS CONSOLIDATED

BACKGROUND

Technical Field

Embodiments described herein generally relate to processors. In particular, embodiments described herein generally relate to processing packed data elements in processors.

Background Information

Many processors have Single Instruction, Multiple Data (SIMD) architectures. In SIMD architectures, multiple data elements may be packed within one register or memory location as packed data or vector data. In packed data, the bits of the register or other storage location may be logically divided into a sequence of data elements. For example, a 128-bit wide packed data register may have two 64-bit data elements, four 32-bit data elements, eight 16-bit data elements, or sixteen 8-bit data elements. Each of the data elements may represent a separate individual piece of data (e.g., a pixel color, a component of a complex number, etc.), which may be operated upon separately and/or independently of the others.

In SIMD architectures, a packed data instruction, vector instruction, or SIMD instruction may operate on multiple data elements of a packed data operand, or multiple pairs of data elements in two packed data operands, simultaneously and/or in parallel. The processor may have parallel execution hardware responsive to the packed data instruction to perform the multiple operations simultaneously or in parallel.

Various different types of packed data instructions are known in the arts. One class of packed data instructions are shuffle instructions. The shuffle instructions may be used to shuffle data elements from a source packed data operand to different locations in a result packed data operand through the use of corresponding sets of shuffle control bits for each data element shuffled. However, one drawback with the use of such shuffle instructions for certain applications is that multiple bits of shuffle control are needed for each data element that is shuffled. This may tend to increase the number of bits needed for such shuffle control beyond the limits of certain applications (e.g. beyond the number of bits that can fit in an immediate of an instruction). In addition, it takes extra time to create or generate the shuffle control bits.

BRIEF DESCRIPTION OF THE DRAWINGS

The invention may best be understood by referring to the following description and accompanying drawings that are used to illustrate embodiments. In the drawings:

FIGS. 7A-7C are block diagrams of several embodiments of data element selection and consolidation instructions.

FIG. 10 is a diagram of an example embodiment of a packed data operation mask register and showing that the number of bits that are used as a packed data operation mask and/or for masking depends upon the packed data width and the data element width.

FIG. 11A is a block diagram illustrating an embodiment of an in-order pipeline and an embodiment of a register renaming out-of-order issue/execution pipeline.

FIG. 11B is a block diagram of an embodiment of processor core including a front end unit coupled to an execution engine unit and both coupled to a memory unit.

DETAILED DESCRIPTION OF EMBODIMENTS

Disclosed herein are data element selection and consolidation instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
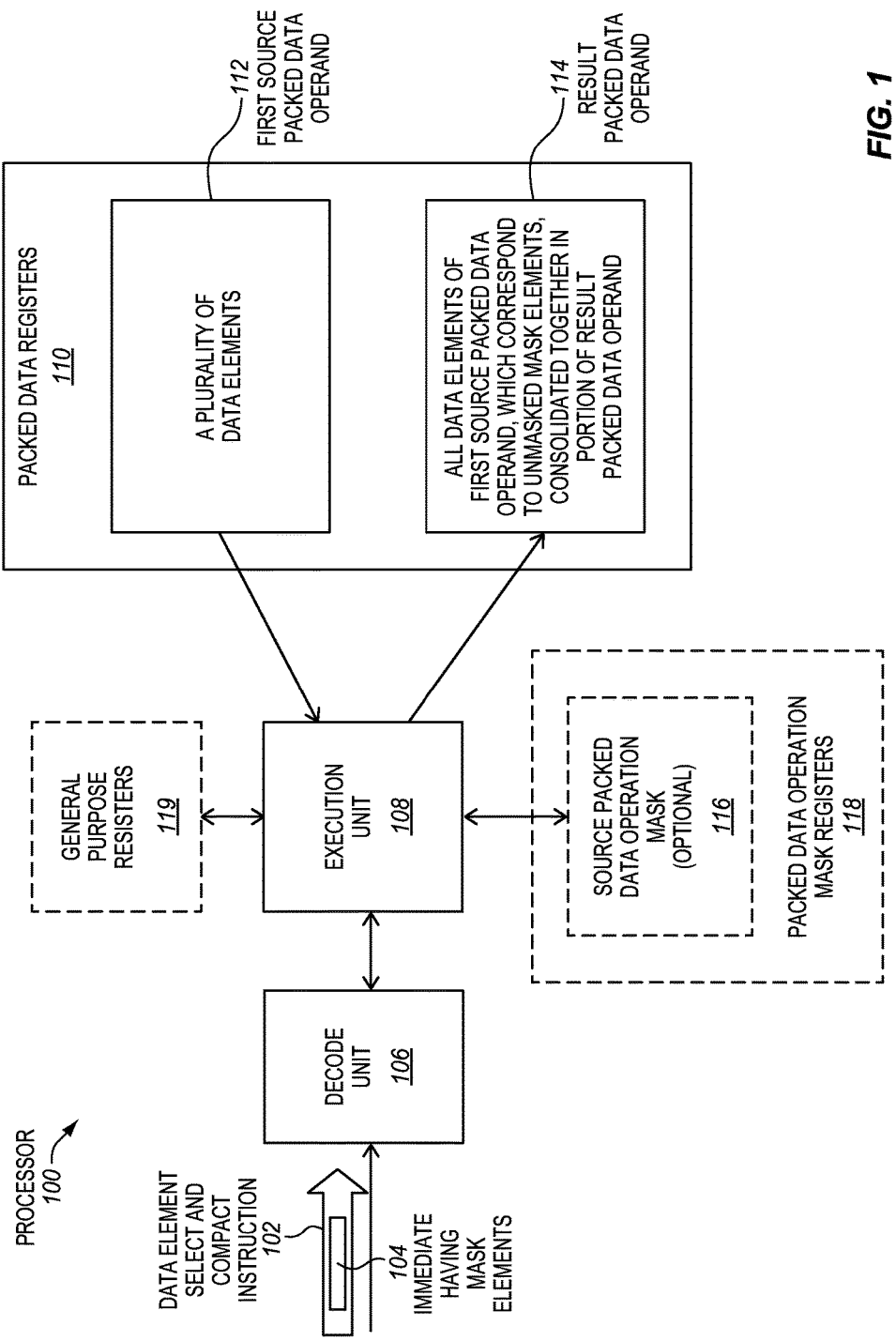
FIG. 1 is a block diagram of an embodiment of a processor that is operable to perform an embodiment of a data element selection and consolidation instruction.

FIG. 1 is a block diagram of an embodiment of a processor 100 that is operable to perform an embodiment of a data element selection and consolidation instruction 102. In some embodiments, the processor may be a general-purpose processor (e.g., a general-purpose microprocessor or central processing unit (CPU) of the type used in desktop, laptop, or other computers). In one aspect, the processor may represent a general-purpose core of a system-on-chip that integrates network and/or packet related processing. In one aspect, the data element selection and consolidation instruction may allow the general-purpose processor or core to more efficiently perform network and/or packet processing. Alternatively, the processor may be a special-purpose processor. Examples of suitable special-purpose processors include, but are not limited to, network processors, communications processors, packet processors, embedded packet processing engines, switch chips, dataplane processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 100 may receive the data element selection and consolidation instruction 102. For example, the instruction may be received from memory on interconnect. The instruction may represent a macroinstruction, assembly language instruction, machine code instruction, or other instruction or control signal of an instruction set of the processor. In some embodiments, the data element selection and consolidation instruction may explicitly specify (e.g., through one or more fields or a set of bits), otherwise indicate (e.g., implicitly indicate), or otherwise have a first source packed data operand 112 that is to have a plurality of data elements. In some embodiments, the data element selection and consolidation instruction may explicitly specify (e.g., through one or more fields or a set of bits), otherwise indicate (e.g., implicitly indicate), or otherwise have (e.g., have as an immediate), a second source operand 104 that is to have a corresponding plurality of mask elements. In the illustrated embodiment, the second source operand 104 comprises an immediate of the instruction, such as, for example, a 4-bit immediate (imm4), an 8-bit immediate (imm8), a 16-bit immediate (imm16), or a 32-bit immediate (imm32), to name just a few examples. The immediate may have mask bits as the mask elements. Each unmasked mask bit may have a first value (e.g., binary one according to one possible convention), whereas each masked-out mask bit may have a second different value (e.g., binary zero according to one possible convention). In other embodiments, the second source operand 104 may optionally be a source packed data operation mask 116, which may optionally be stored in a set of packed data operation mask registers 118. In still other embodiments, the second source operand 104 may optionally be stored in a set of general-purpose registers 119. In still other embodiments, the second source operand 104 may optionally be a second source packed data operand that is optionally stored in a set of packed data registers 110. The instruction may also specify or otherwise indicate a destination storage location where a result packed data operand 114 is to be stored. As one example, the instruction may have source and/or destination operand specification fields to specify registers, memory locations, or other storage locations for the operands. Alternatively, one or more of these operands may optionally be implicit to the instruction (e.g., implicit to an opcode of the instruction).

Referring again to FIG. 1, the processor includes a decode unit or decoder 106. The decode unit may receive and decode the data element selection and consolidation instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level data element selection and consolidation instruction. In some embodiments, the decode unit may include one or more input structures (e.g., port(s), interconnect(s), an interface) to receive the data element selection and consolidation instruction, an instruction recognition and decode logic coupled therewith to recognize and decode the data element selection and consolidation instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the data element selection and consolidation instruction being provided directly to the decode unit, an instruction emulator, translator, morpher, interpreter, or other instruction conversion module may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the data element selection and consolidation instruction, which may be of a first instruction set, and may emulate, translate, morph, interpret, or otherwise convert the data element selection and consolidation instruction into one or more corresponding intermediate instructions or control signals, which may be of a second different instruction set. The one or more intermediate instructions or control signals of the second instruction set may be provided to a decode unit (e.g., decode unit 106), which may decode them into one or more lower-level instructions or control signals executable by native hardware of the processor (e.g., one or more execution units).

Referring again to FIG. 1, the processor 100 also includes a set of packed data registers 110. In some embodiments, the processor may include a set of general-purpose registers 119. In some embodiments, the processor may also optionally include a set of packed data operation mask registers 118. Each of these registers may represent an on-die storage location that is operative to store data. For example, each of the packed data registers may store packed data, vector data, or Single instruction, multiple data (SIMD) data. These registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). These registers may be implemented in different ways in different microarchitectures using well-known techniques and are not limited to any particular type of design. Examples of suitable types of registers include, but are not limited to, dedicated physical registers, dynamically allocated physical registers using register renaming, and combinations thereof.

In some embodiments, the first source packed data operand 112 may optionally be stored in a packed data register, and the destination storage location, where the result packed data operand 114 is to be stored, may optionally be either the same or a different packed data register. Alternatively, memory locations, or other storage locations, may optionally be used for one or more of these operands. In some embodiments, a packed data register used for a source packed data operand (e.g., the first source packed data operand 112) may optionally be reused as the destination storage location for the result packed data operand 114. For example, a single source/destination register may be implicitly or impliedly understood to be used for both the source and result packed data operands.

Referring again to FIG. 1, the execution unit 108 is coupled with the decode unit 106 and the packed data registers 110. The execution unit may receive the one or more decoded or otherwise converted instructions or control signals that represent and/or are derived from the data element selection and consolidation instruction. The execution unit may also receive the first source packed data operand 112 and the second source operand 104 (e.g., the immediate 104) having the plurality of mask elements. The execution unit may be operative, in response to and/or as a result of the data element selection and consolidation instruction (e.g., in response to one or more instructions or control signals decoded from the instruction), to store the result packed data operand 114 in the destination storage location indicated by the instruction. In some embodiments, the result packed data operand 114 may include all data elements of the first source packed data operand 112, which correspond to unmasked mask elements of the immediate 104 or other second source operand 104, consolidated together in a portion of the result packed data operand 114. In some embodiments, the result packed data operand may omit all data elements of the first source packed data operand that correspond to masked-out mask elements of the second source operand. In some embodiments, the unmasked data elements of the first source packed data operand may be consolidated together in a least significant portion of the result packed data operand. In other embodiments, the unmasked data elements of the first source packed data operand may be consolidated together in a most significant portion of the result packed data operand. In some embodiments, the result packed data operand may be any of those shown and described for FIGS. 3-5, although the scope of the invention is not so limited.

In some embodiments, the consolidation of the unmasked data elements in the result packed data operand may be implicit to and/or fixed for the instruction (e.g., an opcode of the instruction), instead of being explicitly specified and/or flexible for the instruction. For example, the instruction may have an opcode that indicates or specifies that the unmasked data elements are to be consolidated in the result packed data operand. That is, the opcode and/or the instruction may be dedicated specifically to consolidation of unmasked data elements in the result packed data operand. The use of such a dedicated and/or fixed and/or implicit feature for the opcode and/or instruction may help to avoid needing to generate and use explicit control (e.g., explicit control fields) to be used with a flexible instruction (e.g., a full shuffle or permute instruction). In one aspect, the unmasked data elements may be consolidated in the result packed data operand regardless of any particular arrangement of the data elements in the first source packed data operand, and regardless of any particular arrangement of the mask elements in the second source operand.

Advantageously, the data element selection and consolidation instruction/operation allows a subset of data elements to be selected and compacted together within the confines of the execution of a single instruction. The compaction operation is advantageous in embodiments where only the selected subset of the source data elements are desired for further processing. As one example, after an initial packet decode, only certain flow bytes (e.g., a four-tuple defining the source and destination addresses and the source and destination ports) may be selected and consolidated together for subsequent packets so that a fast check may be performed to confirm that these packets belong to the same flow. As another example, only a subset of relatively more entropic source data elements (e.g., of a packet) may be selected and consolidated together so that a hash, checksum, or other cryptographic function may be performed on these relatively more entropic bytes. In this way, the cryptographic function doesn't need to be performed on the relatively less entropic data elements, which may not be selected. Another possible use would be sub-sampling of graphics data. Other uses will be apparent to those skilled in the art and having the benefit of the present disclosure. It would also be possible to use one instruction to select the desired source data elements and additional instructions to consolidate the selected source data elements together (e.g., by one or more instructions to shift the whole operand, one or more instructions to perform masked logical operations, etc.). However, the single data element selection and consolidation instruction may help to increase performance over such a software implementation involving multiple or potentially many instructions especially in the case of large numbers of data elements.

The execution unit and/or the processor may include specific or particular logic (e.g., transistors, integrated circuitry, or other hardware potentially combined with firmware (e.g., instructions stored in non-volatile memory) and/or software) that is operable to perform the data element selection and consolidation instruction and/or store the result in response to and/or as a result of the data element selection and consolidation instruction (e.g., in response to one or more instructions or control signals decoded from the data element selection and consolidation instruction). By way of example, the execution unit may include an arithmetic logic unit, a logic unit, or the like. In some embodiments, the execution unit may include one or more input structures (e.g., port(s), interconnect(s), an interface) to receive source operands, circuitry or logic coupled therewith to receive and process the source operands and generate the result operand, and one or more output structures (e.g., port(s), interconnect(s), an interface) coupled therewith to output the result operand. In some embodiments, the circuitry or logic to process the source operands and generate the result operand may optionally include data element selection and routing logic. For example, multiplexers to select data elements and interconnects to route the selected data elements.

To avoid obscuring the description, a relatively simple processor has been shown and described. However, the processor may optionally include other well-known processor components. Possible examples of such components include, but are not limited to, general-purpose registers, a status register (sometimes called a flags register), system control registers, an instruction fetch unit, prefetch buffers, one or more levels of cache (e.g., a level 1 (L1) instruction cache, an L1 data cache, and an L2 data/instruction cache), an instruction translation lookaside buffer (TLB), a data TLB, a branch prediction unit, out-of-order execution units (e.g., an instruction scheduling unit, a register rename and/or allocation unit, an instruction dispatch unit, a reorder buffer (ROB), a reservation station, a memory order buffer, a retirement unit, etc.), a bus interface unit, an address generation unit, a debug unit, a performance monitor unit, a power management unit, other components included in processors, and various combinations thereof. Such components may be coupled together in various different suitable combinations and/or configurations known in the arts. Embodiments are not limited to any known such combination or configuration. Moreover, embodiments may be included in processors have multiple cores at least one of which is operative to perform a data element selection and consolidation instruction.

Figure 2:
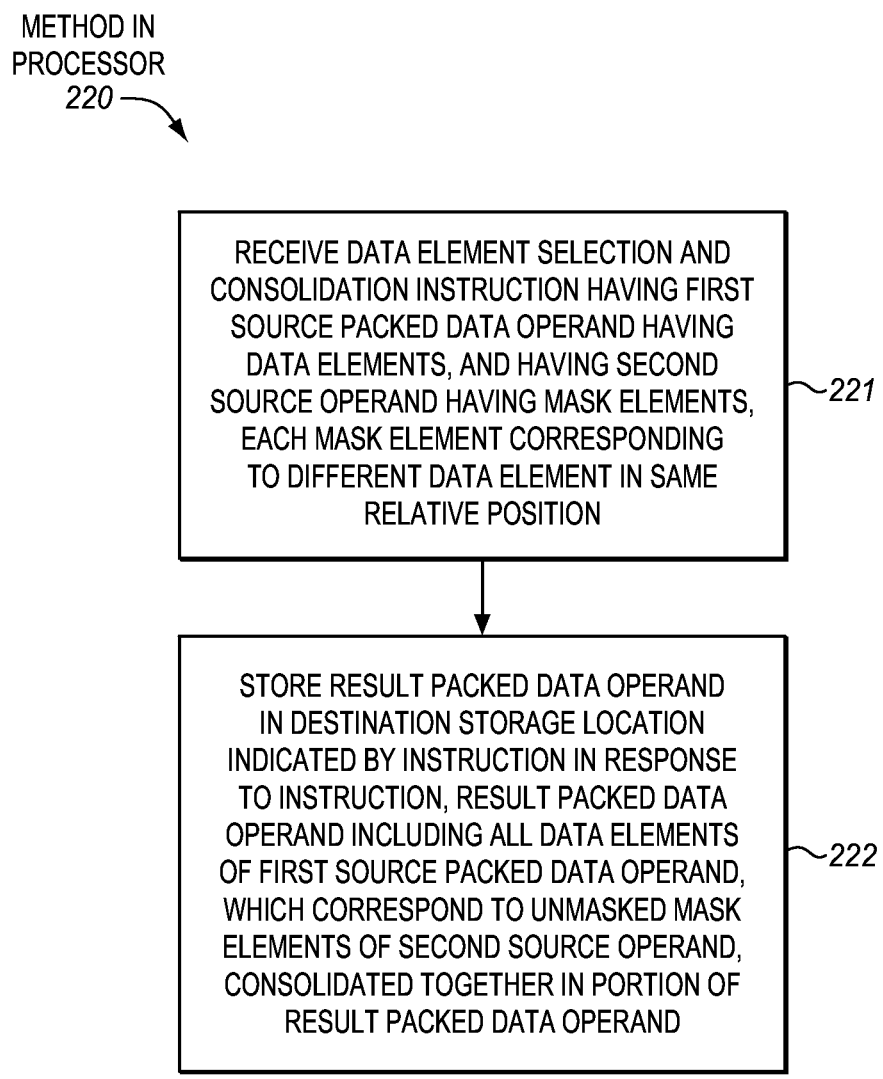
FIG. 2 is a block flow diagram of an embodiment of a method in a processor of performing an embodiment of a data element selection and consolidation instruction.

FIG. 2 is a block flow diagram of an embodiment of a method 220 in a processor of performing an embodiment of a data element selection and consolidation instruction. In some embodiments, the method 220 may be performed by and/or within the processor 100 of FIG. 1. The components, features, and specific optional details described herein for the processor 100, also optionally apply to the method 220. Alternatively, the method 220 may be performed by and/or within a similar or different processor or other apparatus. Moreover, the processor 100 may perform methods the same as, similar to, or different than those of the method 220.

The method includes receiving the data element selection and consolidation instruction, at block 221. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The data element selection and consolidation instruction may specify, otherwise indicate, or otherwise have a first source packed data operand having a plurality of data elements, and may specify, otherwise indicate, or otherwise have a second source operand having a plurality of mask elements. Each mask element of the second source operand may correspond to a different data element of the first source packed data operand (e.g., in a same bit position, in a same relative position within the operands, etc.).

A result packed data operand may be stored in a destination storage location in response to and/or as a result of the data element selection and consolidation instruction, at block 222. The destination storage location may be specified or otherwise indicated by the data element selection and consolidation instruction. In some embodiments, the result packed data operand may include all data elements of the first source packed data operand, which correspond to unmasked mask elements of the second source operand, consolidated together in a portion of the result packed data operand.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally expanding each bit of a bit mask to a same size as the data elements of the first source packed data operand and performing a logical operation (e.g., a logical AND) on the expanded data element mask and the first source packed data operand, although this is not required.

Figure 3:
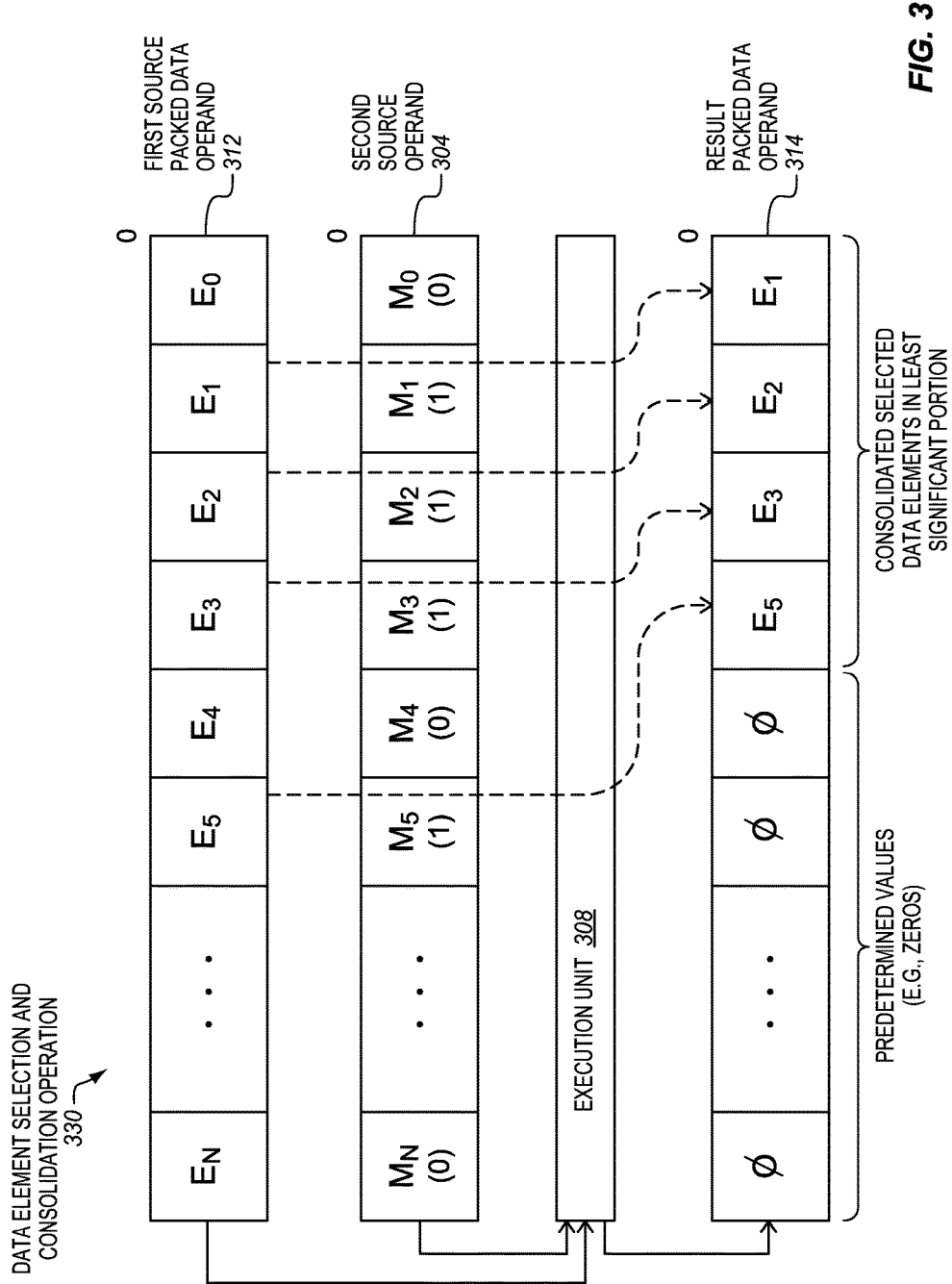
FIG. 3 is a block diagram of an embodiment of a data element selection and consolidation operation.

FIG. 3 is a block diagram illustrating an embodiment of a data element selection and consolidation operation 330 that may be performed in response to an embodiment of a data element selection and consolidation instruction. The instruction may explicitly specify (e.g., through one or more fields or a set of bits), otherwise indicate (e.g., implicitly indicate), or otherwise have a first source packed data operand 312 that is to have a plurality of packed data elements E0-EN.

The number of data elements EU to EN in the first source packed data operand 312 may vary. Commonly, the number of data elements E0-EN may be equal to the size in bits of the first source packed data operand divided by the size in bits of a single data element (e.g., EU). In various embodiments, the size or bit width of the first source packed data operand may be 64-bits, 128-bits, 256-bits, 512-bits, or 1024-bits, although the scope of the invention is not so limited. In various embodiments, the size or bit width of each data element (e.g., E0) may be 8-bits, 16-bits, 32-bits, or 64-bits, although the scope of the invention is not so limited. As a few representative examples, a 128-bit packed 8-bit byte format may include sixteen 8-bit byte data elements, a 128-bit packed 16-bit data element format may include eight 16-bit data elements, a 256-bit packed byte format may include thirty-two 8-bit byte data elements, a 256-bit packed 16-bit data element format may include sixteen 16-bit data elements, and a 256-bit packed 32-bit data element format may include eight 32-bit data elements, to name just a few examples. In various embodiments, in order to achieve the greatest efficiency enhancements with the data element selection and consolidation operation, there may be at least eight, at least sixteen, or more than sixteen (e.g., thirty-two, sixty four, etc.) data elements E0-EN in the first source packed data operand.

In some embodiments, the instruction may have a set of one or more bits and/or a field to indicate a size or bit width of the data elements of the first source packed data operand. For example, a 2-bit field may have four different values to indicate four different sizes of data elements (e.g., 00 for 8-bits, 01 for 16-bits, 10 for 32-bits, and 11 for 64-bits). In other embodiments, the size or bit width of the data elements of the first source packed data operand may optionally be specified or indicated in a register (e.g., a mode register). For example, a first value in the mode register may indicate that the data elements of a packed data register are to be interpreted as 8-bit byte elements, whereas a second value in the mode register may indicate that they data elements of the packed data register are to be interpreted as 16-bit data elements.

The instruction may also explicitly specify (e.g., through one or more fields or a set of bits), otherwise indicate (e.g., implicitly indicate), or otherwise have (e.g., have as an immediate), a second source operand 304 that is to have a corresponding plurality of mask elements M0 to MN. The second source operand may have a different mask element (M) for each corresponding different data element (E) of the first source packed data operand. Each mask element (M) in the second source operand may correspond to a different data element (E) in the first source packed data operand (e.g., in a same bit position and/or a same relative position within the operands). For example, $E_0$ may correspond to $M_0$, $E_1$ may correspond to $M_1$, and so on. It is often convenient, for the corresponding data elements and mask elements to be in corresponding relative positions within the operands, although this is not required and other conventions for correspondence may also optionally be used.

In some embodiments, each mask element may be a single mask bit. Alternatively, two or more bits may optionally be used for each mask element. For example, each mask element may have a same number of bits as each corresponding data element in the first source packed data operand (e.g., 8-bits, 16-bits, 32-bits, etc.). Virtually any number of bits could be used for the mask elements as desired for the particular implementation including a single bit recognized as a mask bit but included in a data element (e.g., the most significant or least significant bit of the data element). In some embodiments, the second source operand may represent a bit mask operand and may have mask bits as the mask elements. Such a bit mask operand may be provided in different ways in different embodiments. In some embodiments, the second source bit mask operand may represent an immediate of the instruction. In other embodiments, the second source bit mask operand may be stored in a packed data operation mask register (e.g., one of the registers 118 and/or 918). In still other embodiments, the second source bit mask operand may be stored in a general-purpose register (e.g., one of registers 119. Alternatively, instead of a bit mask operand, the second source operand may represent a packed data element mask operand and may have data elements as the mask elements. For example, the second source packed data element mask operand may be stored in a packed data register (e.g., one of the packed data registers 110 and/or 810).

Each mask element may be operative to conditionally control or mask whether or not a corresponding data element from the first source packed data operand is to be selected or configured to appear in the result packed data operand. The masking may be at per-data element granularity such that each different data element may be masked-out or unmasked separately and/or independently of the others. Each unmasked mask element may have a first value (e.g., a value of one (1) according to one possible convention) to select a corresponding data element for inclusion in a consolidated or grouped set of data elements of the result packed data operand 314, whereas each masked-out mask element may have a second different value (e.g., a value of zero (0) according to one possible convention) to omit a corresponding data element from inclusion in the consolidated or grouped set of data elements of the result packed data operand. The illustration adopts this convention. Various other conventions are also possible for the values that select or omit the corresponding data elements from the consolidation.

A result packed data operand 314 may be generated (e.g., by an execution unit 308) and stored in a destination storage location in response to the data element selection and consolidation instruction/operation. The destination storage location may be specified or otherwise indicated by the instruction. In various embodiments, the destination storage location may be a packed data register, a memory location, or other storage location. In some embodiments, the result packed data operand 314 may include all data elements of the first source packed data operand 312, which correspond to unmasked mask elements of the second source operand 304, consolidated together in a portion of the result packed data operand 314. According to the convention adopted in the illustration, masked-out mask elements have a value of zero (0), whereas unmasked mask elements have a value of one (1), although the scope of the invention is not so limited. In the illustrated example, the data elements $E_1$, $E_2$, $E_3$, and $E_5$ correspond to unmasked mask elements $M_1$, $M_2$, $M_3$, and $M_5$, whereas the data elements $E_0$, $E_4$, and $E_N$ correspond to masked-out mask elements $M_0$, $M_4$, and $M_N$. As shown, in some embodiments, the unmasked or selected data elements (e.g., $E_1$, $E_2$, $E_3$, and $E_5$) may be consolidated together as a set of consolidated selected or unmasked data elements in a least significant portion of the result packed data operand, and may appear or be arranged in a same order in which they appeared or were arranged in the first source packed data operand. Alternatively, the unmasked or selected data elements may optionally be consolidated together in a most significant portion of the result packed data operand, and may appear or be arranged in a same order in which they appeared or were arranged in the first source packed data operand. Various ways are contemplated to achieve this including though routing, moving, rearranging, copying, or otherwise storing the unmasked or selected data elements into the appropriate positions.

In the result packed data operand, the consolidated together unmasked data elements (e.g., $E_1$, $E_2$, $E_3$, and $E_5$) may omit all masked-out data elements (e.g., $E_0$, $E_4$, and $E_N$). That is, the consolidated unmasked data elements may not have any masked-out data elements disposed between them. For example, in the first source operand $E_4$ is disposed between $E_3$ and $E_5$, but in the result packed data operand $E_5$ and $E_3$ are consolidated together and adjacent to one another without $E_4$ disposed between them. Accordingly, a potentially non-contiguous subset of unmasked data elements with masked-out data elements dispersed between them may be consolidated or compacted together and stored in a lowest order or highest order portion of the result operand. In some embodiments, the masked-out data elements (e.g., $E_0$, $E_4$, and $E_N$) may merely be discarded or deleted and may not need to be conveyed to the destination. In such cases, and when the consolidated unmasked data elements are stored in a least significant portion of the result operand, bits more significant than those needed to store the total number of unmasked data elements may optionally store a predetermined value. For example, as shown in the illustration, these bits or data elements may optionally be zeroed out in the result packed data operand. As another option, rather than storing zeroes in these bits, the existing bits or data could be left unchanged. This may help to reduce memory bandwidth access. The processor may know the number of data elements that are consolidated and thereby know the bounds of the resulting consolidated elements. As yet another option, in other embodiments, the masked-out data elements (e.g., $E_0$, $E_4$, and $E_N$) may optionally be routed, moved, copied, or otherwise stored to another portion of the result packed data operand not used to store the consolidated together unmasked data elements.

In some embodiments, a value indicative of the number of unmasked data elements consolidated together in the result may optionally be stored (e.g., in a general-purpose or other register) responsive to the instruction. For example, in FIG. 4, a value indicative of eight may optionally be stored to indicate that eight unmasked data elements have been consolidated in the result. This may help to allow only the number of consolidated unmasked data elements in the result to be accessed without needing to compute this number separately, but is optional not required. This aspect may also be used with other embodiments disclosed herein (e.g., FIGS. 1-5).

Figure 4:
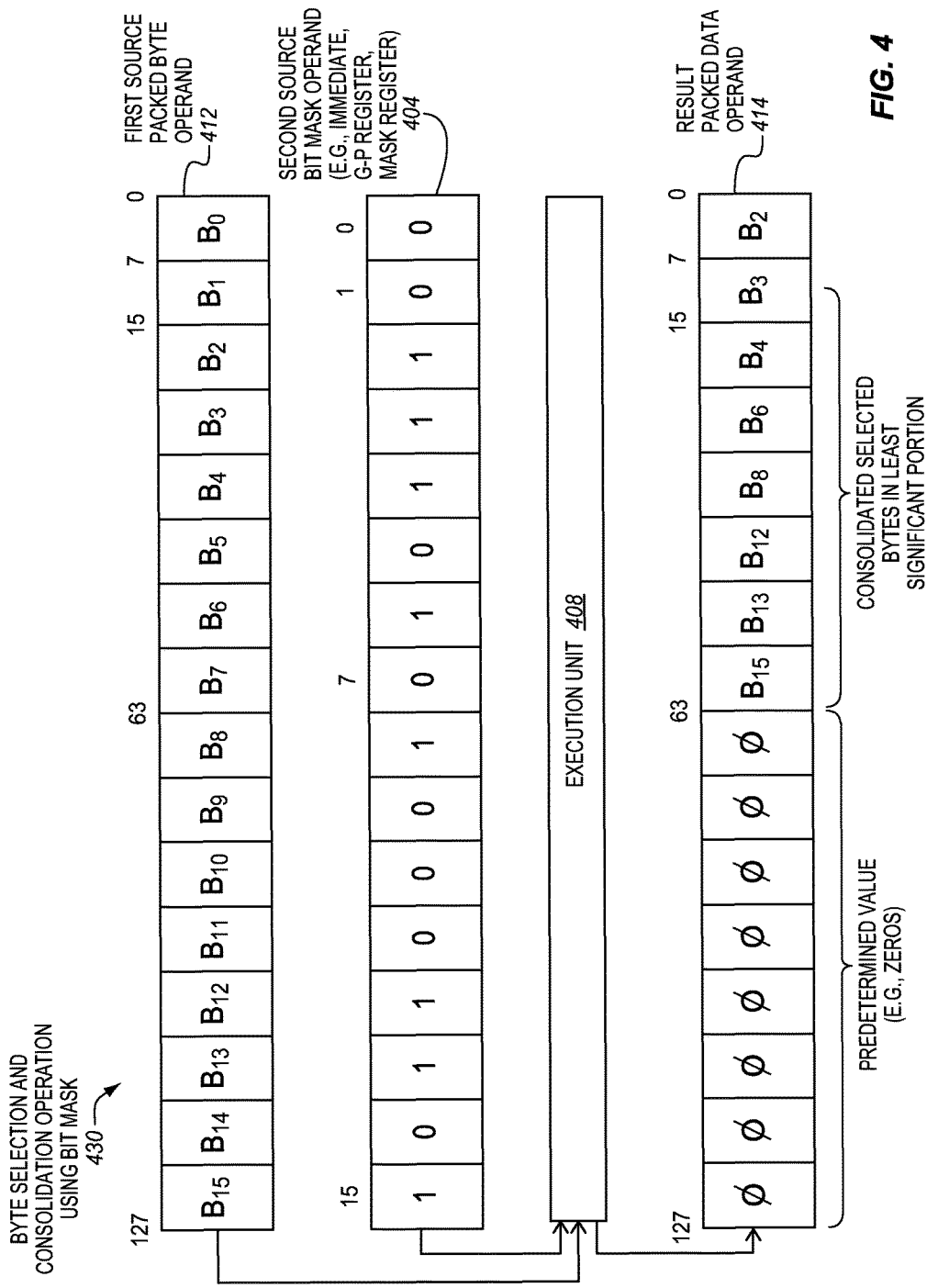
FIG. 4 is a block diagram of a particular example embodiment of a byte selection with bit mask and consolidation operation.

FIG. 4 is a block diagram illustrating a particular example embodiment of a byte selection with bit mask and consolidation operation 430 that may be performed in response to an embodiment of byte selection with bit mask and consolidation instruction. The example operation of FIG. 4 has certain similarities to the more generalized operation of FIG. 3. To avoid obscuring the description, the different and/or additional characteristics for the example operation of FIG. 4 will primarily be described, without repeating all the optionally similar or common characteristics and details relative to the more generalized operation of FIG. 3. However, it is to be appreciated that the previously described characteristics and details of the more generalized operation of FIG. 3 may also optionally apply to the example operation of FIG. 4, unless stated otherwise or otherwise clearly apparent (e.g., if they pertain to data element masks instead of bit masks).

In this example embodiment, the instruction specifies, otherwise indicates, or otherwise has a first 128-bit source packed byte operand 412 that has sixteen 8-bit byte data elements $B_0$ to $B_{15}$. This is just one example. Other embodiments may have either narrower (e.g., 64-bit) or wider (e.g., 256-bit, 512-bit, 1024-bit) operands, and may have other sized data elements (e.g., 16-bit data elements, 32-bit data elements, 64-bit data elements, etc.).

In the example embodiment of FIG. 4, the instruction specifies, otherwise indicates, or otherwise has a second 16-bit source bit mask operand 404 that has sixteen mask bits. Each of these bits corresponds to a byte of the first source packed byte operand in a same relative position within the operands (e.g., the vertically aligned data element in the illustration). Each unmasked mask bit may have a first value (e.g., binary one according to one possible convention which is adopted in the illustration), whereas each masked-out mask bit may have a second different value (e.g., binary zero according to the convention adopted in the illustration). Specifically, in the illustrated example, the values of these bits are, from a least significant end on the right to a most significant end on the left, [0011101010001101]. This is merely one example set of bit values. According to this example, the bytes $B_0$, $B_1$, $B_5$, $B_7$, $B_9$, $B_{10}$, $B_{11}$, and $B_{14}$ are masked-out bytes, whereas the bytes $B_2$, $B_3$, $B_4$, $B_6$, $B_8$, $B_{12}$, $B_{13}$, and $B_{15}$ are unmasked bytes. It is to be appreciated that other embodiments may use either narrower or wider bit mask operands (e.g., one bit for each data element in the other source packed data operand).

One potential advantage of a bit mask, as compared to a data element mask (e.g., a byte mask), is that it may help to reduce resource utilization/consumption associated with transferring and/or utilizing the mask. Representatively, examples of possible types of resource utilization/consumption that may potentially be reduced, depending on the particular implementation, include but are not limited to, those associated with memory busses, the central processing unit (CPU), a graphics processing unit (GPU), system-on-chip (SoC) interconnects, network interfaces, general purpose input and/or output (I/O) busses, cache port bandwidth, processor re-order buffers, load buffers, memory combining buffers, cache lines, physical and virtual memory, and the like.

In some embodiments, the second 16-bit source bit mask operand 404 may represent an immediate of the instruction. For example, the sixteen mask bits may optionally be stored in a 16-bit, 20-bit, 32-bit, or other sized immediate. In some embodiments, the mask bits of the immediate may be determined at runtime (e.g., by a packet protocol decoder as will be discussed further below, by a runtime compiler, etc.). In other embodiments, the second 16-bit source bit mask operand may optionally be stored in a packed data operation mask register (e.g., one of the registers 118 and/or 918). In one aspect, the packed data operation mask register may be dedicated primarily for predication. In one aspect, other instructions of an instruction set of the processor may indicate the packed data operation mask register as a predicate operand to predicate a packed data operation (e.g., a packed multiply operation, a packed add operation, a packed rotate operation, a packed compare operation, or the like. In still other embodiments, the second 16-bit source bit mask operand may optionally be stored in a general-purpose register (e.g., one of registers 119).

A result packed data operand 414 may be generated (e.g., by an execution unit 408) and stored in a destination storage location in response to the instruction/operation. In some embodiments, the result packed data operand may include all data elements of the first source packed byte operand 412, which correspond to unmasked mask bits of the second source bit mask operand 404, consolidated together in a portion of the result packed data operand 414. As shown, the unmasked bytes (e.g., $B_2$, $B_3$, $B_4$, $B_6$, $B_8$, $B_{12}$, $B_{13}$, and $B_{15}$) may be consolidated together in a least significant portion (e.g., eight least significant bytes) of the result packed data operand. The most significant bytes of the result packed data operand not needed to store all unmasked bytes (e.g., in this case the eight most significant bytes) may optionally have a predetermined value (e.g., be cleared to all zeroes). As another option, rather than storing zeroes in these bits, the existing bits or data could be left unchanged. This may help to reduce memory bandwidth access. The processor may know the number of data elements that are consolidated and thereby know the bounds of the resulting consolidated elements. Alternatively, the unmasked bytes may optionally be consolidated together into a most significant portion, or other portion, of the result packed data operand. In the illustrated embodiment, the masked-out bytes (e.g., $B_0$, $B_1$, $B_5$, $B_7$, $B_9$, $B_{10}$, $B_{11}$, and $B_{14}$) are omitted from the result packed data operand. Alternatively, in other embodiments, the masked-out bytes may optionally be consolidated together and stored in another portion of the result packed data operand not used to store the unmasked bytes.

Figure 5:
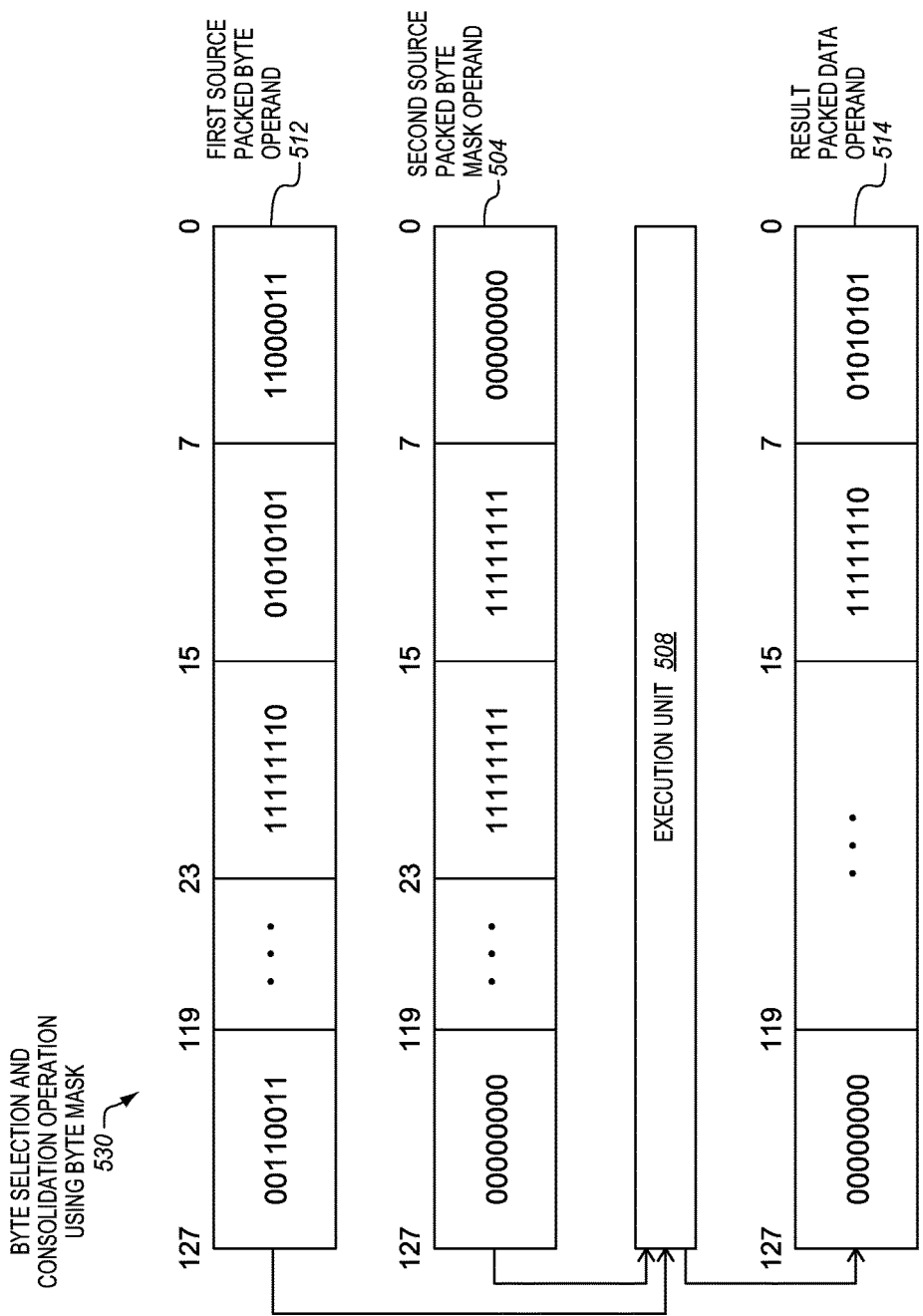
FIG. 5 is a block diagram of a particular example embodiment of a byte selection with a byte mask operand and consolidation operation.

FIG. 5 is a block diagram illustrating a particular example embodiment of a byte selection with a byte mask operand and consolidation operation 530 that may be performed in response to an embodiment of byte selection with bit mask and consolidation instruction. The example operation of FIG. 5 has certain similarities to the more generalized operation of FIG. 3. To avoid obscuring the description, the different and/or additional characteristics for the example operation of FIG. 5 will primarily be described, without repeating all the optionally similar or common characteristics and details relative to the more generalized operation of FIG. 3. However, it is to be appreciated that the previously described characteristics and details of the more generalized operation of FIG. 3 may also optionally apply to the example operation of FIG. 5, unless stated otherwise or otherwise clearly apparent (e.g., if they pertain to bit masks instead of byte masks).

In this example embodiment, the instruction specifies, otherwise indicates, or otherwise has a first 128-bit source packed byte operand 512 that has sixteen 8-bit byte data elements. Other embodiments may have either narrower (e.g., 64-bit) or wider (e.g., 256-bit, 512-bit, 1024-bit) operands, and may have other sized data elements (e.g., 16-bit data elements, 32-bit data elements, 64-bit data elements, etc.), as previously described.

In this example embodiment, the instruction specifies, otherwise indicates, or otherwise has a second 128-bit source packed byte mask operand 504 that has sixteen mask bytes. Each of these mask bytes corresponds to a byte of the first source packed byte operand in a same relative position within the operands (e.g., a same bit position and shown in vertically alignment in the illustration). Each unmasked mask byte may have a first value (e.g., all ones [11111111] according to one possible convention which is adopted in the illustration), whereas each masked-out mask bit may have a second different value (e.g., all zeroes [00000000] according to the convention adopted in the illustration). In the illustrated example, the least significant byte in bits [7:0] and the most significant byte in bits [127:120] of the first source packed byte operand are masked-out bytes, whereas the bytes in bits [15:8] and [23:16] are unmasked bytes. In some embodiments, the second 128-bit source byte mask operand 504 may optionally be stored in a packed data register (e.g., one of the registers 110 and/or 810). Alternatively, memory locations or other storage locations may optionally be used.

A result packed data operand 514 may be generated (e.g., by an execution unit 508) and stored in a destination storage location in response to the instruction/operation. In some embodiments, the result packed data operand may include all data elements of the first source packed byte operand 512, which correspond to unmasked mask bytes of the second source byte mask operand 504, consolidated together in a portion of the result packed data operand 514. As shown, the unmasked bytes in bits [15:8] and [23:16] may be consolidated together in a least significant portion of the result packed data operand. The most significant bytes of the result packed data operand not needed to store all unmasked bytes may optionally have a predetermined value (e.g., be cleared to all zeroes). Alternatively, the unmasked bytes may optionally be consolidated together into a most significant portion, or other portion, of the result packed data operand. In the illustrated embodiment, the result packed data operand may exclude or omit all masked-out bytes. Alternatively, the masked-out bytes may optionally be optionally consolidated together and stored in another portion of the result packed data operand not used to store the unmasked bytes.

The data element selection and consolidation instructions disclosed herein are general-purpose instructions and may be used for various different purposes. These instructions may be used, either alone, or in combination with other instructions, to select and consolidate data elements in various different ways that are useful for the particular application, algorithm, or code. One possible use of these instructions is to select and consolidate data elements of network packets. For example, flow data elements of the packets representing a four-tuple of data elements defining the source and destination addresses and the source and destination ports for a data flow of network packets may be extracted. The extraction of these flow elements may be useful for various different purposes in networking, such as, for example, for performing context lookups. Various other uses in conjunction with packet processing and/or networking include, but are not limited to, selection and consolidation of various parts of packets for purposes of one or more of header checksums, computing partial digital signatures, ARP caches, packet switching or other forwarding, filtering, content based load balancing, hashing contents of packets, packet classification, and application oriented networking. In another aspect, these instructions may be used either in networking or in other applications to select and consolidate data elements (e.g., relatively more entropic data elements) for input to a cryptographic function (e.g., a hash, checksum, etc.). Yet another possible use of these instructions is to select and consolidate data elements for graphics sub-sampling. A still further use is to accelerate extensible markup language (XML) processing, database applications, image processing, and compression. Various other applications will be apparent to those skilled in the art and having the benefit of the present disclosure. To further illustrate certain concepts, a detailed example of use of a data element selection and consolidation instruction 602 in processing network packets will be provided, although the scope of the invention is not so limited.

Figure 6:
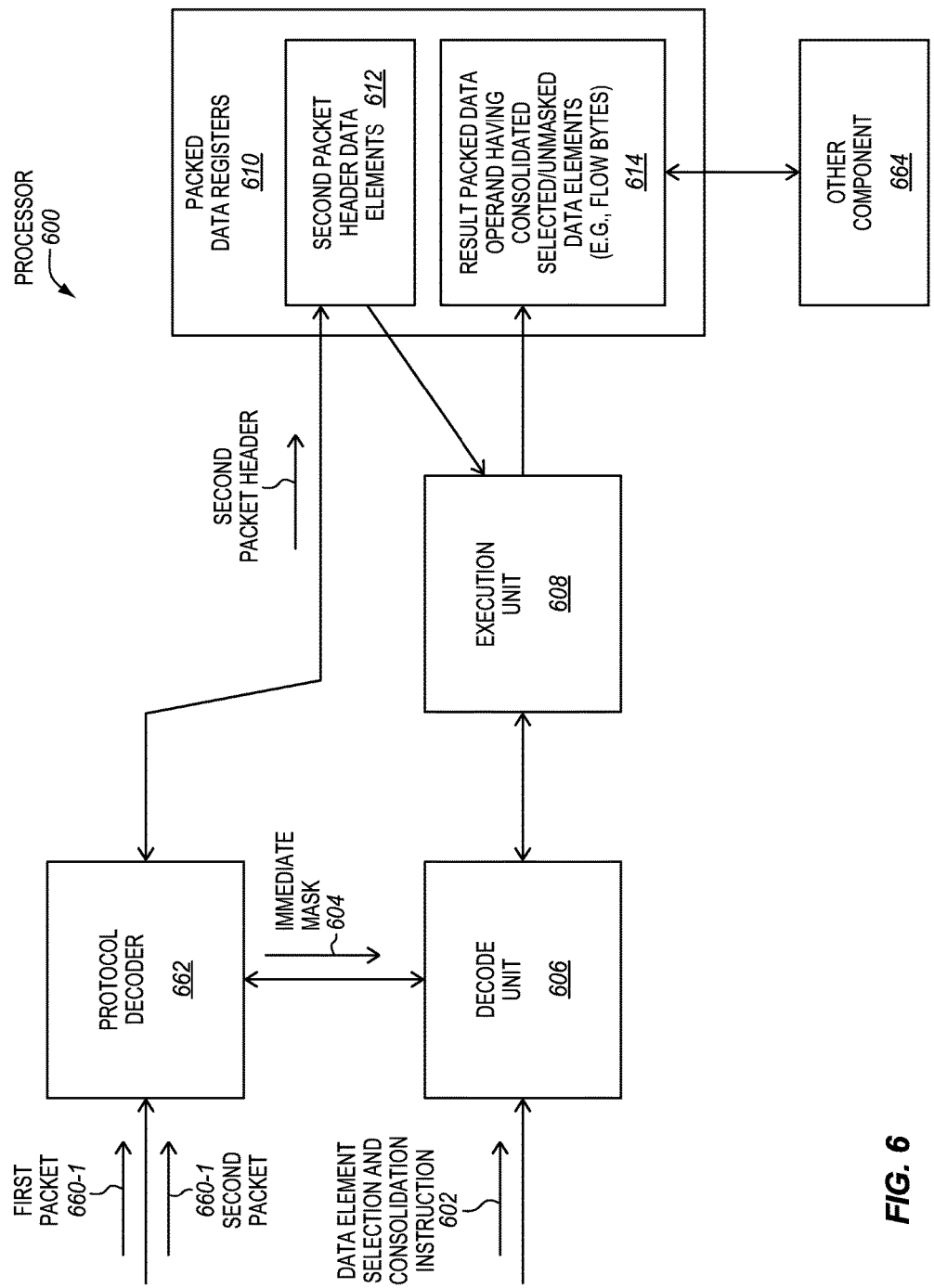
FIG. 6 is a block diagram showing how a data element selection and consolidation instruction may be used to process data elements of network packets in some embodiments.

FIG. 6 is a block diagram of an example embodiment of a processor 600 and showing how a data element selection and consolidation instruction 602 may be used to process data elements of network packets in some embodiments. The processor includes a protocol decoder 662. The protocol decoder is coupled to receive network packets (e.g., from a network interface). The protocol decoder is operative to decode network protocols of these network packets. This may be done in a conventional way. In some embodiments, the protocol decoder may be implemented as a software module (e.g., stored in a memory outside of the processor). Such protocol decoder modules are often used to decode a wider variety of protocols more flexibly. In other embodiments, the protocol decoder may be implemented in hardware on-die and/or on-processor. For example, a hardware protocol decoder may be optionally be included for relatively more commonly used protocols.

Referring again to FIG. 6, the protocol decoder may receive a first packet 660-1. The protocol decoder may rigorously decode or determine the protocols of the first packet. The output of the protocol decode is the determination of protocols at all relevant layers (e.g. TCP/IPV4). Based on this, the protocol decoder may generate mask. For example, the protocol decoder may generate and provide an immediate bit mask 604 (e.g., similar to the immediate 104) to a decode unit 606. The immediate bit mask or other mask may be operative to select certain data elements of interest of packets of the same flow and/or using the same network protocol(s) as the first packet.

Subsequently, a second packet 660-2 of a same flow or connection may be received by the protocol decoder. The protocol decoder, or a header extraction component or other component (not shown), may store at least a portion of a header of the second packet as a packed data operand 612. The packed data operand 612 may have a plurality of packed data elements of the second packet header. The operand may be stored in a set of packed data registers 610, as previously described.

A data element selection and consolidation instruction 602 indicating the packed data operand 612 may be received at a decode unit 606. The decode unit may also receive the mask (e.g., the immediate bit mask 604). The decode unit may decode the instruction as previously described and control or enable an execution unit 608 to perform a data element selection and consolidation operation using the source packed data operand 612 and the mask and store a result packed data operand 614. The result packed data operand may have consolidated selected/unmasked data elements of the header of the second packet.

Which particular data elements of the header of the second packet are selected depends upon the particular implementation. In some embodiment, flow bytes or elements may be selected and consolidated. For example, based on the protocol decoding, the protocol decoder is able to know the positions of the flow bytes (e.g. TCP/IP source/destination address and source/destination port numbers) reside in within the header of the second packet. The protocol decoder may generate the mask such that these flow bytes are unmasked or selected (e.g., unmasked mask elements for each of the flow bytes and masked-out mask elements for other bytes). The extraction and consolidation of these flow bytes may facilitate other operations. For example, another component 664 may use these flow bytes to perform a context lookup, for RSS hashing, or the like. This may help to accelerate flow extraction, which often tends to be a computationally expensive operation in packet processing. In other embodiments, protocol bytes or other elements may be selected and consolidated. This may allow rapid testing of the protocol of subsequent packets without needing to go through such a rigorous protocol decode. In still other embodiments, other bytes or data elements of interest in the second packet header may be selected and consolidated. For example, relatively entropic elements of the header may be extracted and then the other component 664, for example a cryptographic module, may perform a hash or other cryptographic operation on the relatively entropic elements.

FIG. 7A is a block diagram of a first embodiment of a data element selection and consolidation instruction 702A. The instruction includes an operation code or opcode 740A. The opcode may represent a plurality of bits or one or more fields that are operable to identify the instruction and/or the operation to be performed (e.g., a data element selection and consolidation operation). The instruction also includes a first source packed data operand specifier 742A to specify a first source packed data operand. The instruction may optionally include a destination specifier 744A to specify a destination storage location where a result packed data operand is to be stored. By way of example, each of these specifiers (742A, 744A) may include a set of bits or one or more fields to explicitly specify an address of a register, memory location, or other storage location for the associated operand. Alternatively, in another embodiment, one or more of the specifiers may optionally be implicit to the instruction (e.g., implicit to an opcode), rather than being explicitly specified. For example, an instruction may have an implicit fixed register as a source and/or destination that need not be specified explicitly. As another example, in some embodiments, instead of the destination specifier 744A, a same register or other storage location used for the first source packed data operand may optionally be implicitly used as the destination storage location. By way of example, the instruction may replace the separate source and destination specifiers 742A, 744A with a single source/destination specifier that identifies a register or other storage location that is initially to be used for a source operand and is subsequently to be used to store the result operand. In this embodiment, the instruction also has an immediate 704 to provide a source bit mask operand. In some embodiments, the instruction may also have an optional data element size specifier 746A to specify or at least indicate a size of the data elements of the first source packed data operand. The data element size specifier may include one or more bits or fields.

FIG. 7B is a block diagram of a second embodiment of a data element selection and consolidation instruction 702B. The instruction includes an operation code or opcode 740B, a first source packed data operand specifier 742B, an optional destination specifier 744B, and an optional data element size specifier 746B. Each of these may be the same as, or similar to, the correspondingly named components of the instruction 702A, and may have the same variations and alternatives. In this embodiment, instead of the immediate 704, the instruction 702B optionally includes a packed data operation mask specifier 748. The packed data operation mask specifier may specify a packed data operation mask register. Alternatively, the packed data operation mask register may be implicitly indicated.

FIG. 7C is a block diagram of a third embodiment of a data element selection and consolidation instruction 702C. The instruction includes an operation code or opcode 740C, a first source packed data operand specifier 742C, an optional destination specifier 744C, and an optional data element size specifier 746C. Each of these may be the same as, or similar to, the correspondingly named components of the instruction 702A, and may have the same variations and alternatives. In this embodiment, instead of the immediate 704 and/or the packed data operation mask specifier 748, the instruction 702C optionally includes a second source packed data operand specifier 750. The second source packed data operand specifier 750 may explicitly specify a second source packed data register or other packed data operand storage location where a packed data element mask is to be stored. Alternatively, an implicit storage location may optionally be used for the packed data element mask.

It is to be appreciated that these are just a few illustrative example embodiments of suitable instructions. Alternate embodiments may include a subset of the specifiers, may add additional specifiers or fields. In addition, the illustrated order/arrangement of the fields and is not required, but rather the fields may be rearranged variously. Moreover, fields need not include contiguous sequences of bits, but rather may include non-contiguous or separated bits, etc. Some fields may potentially overlap. In some embodiments, the instruction format may have an instruction format as described elsewhere herein (e.g., a VEX or EVEX encoding or instruction format), although the scope of the invention is not so limited.

Figure 8:
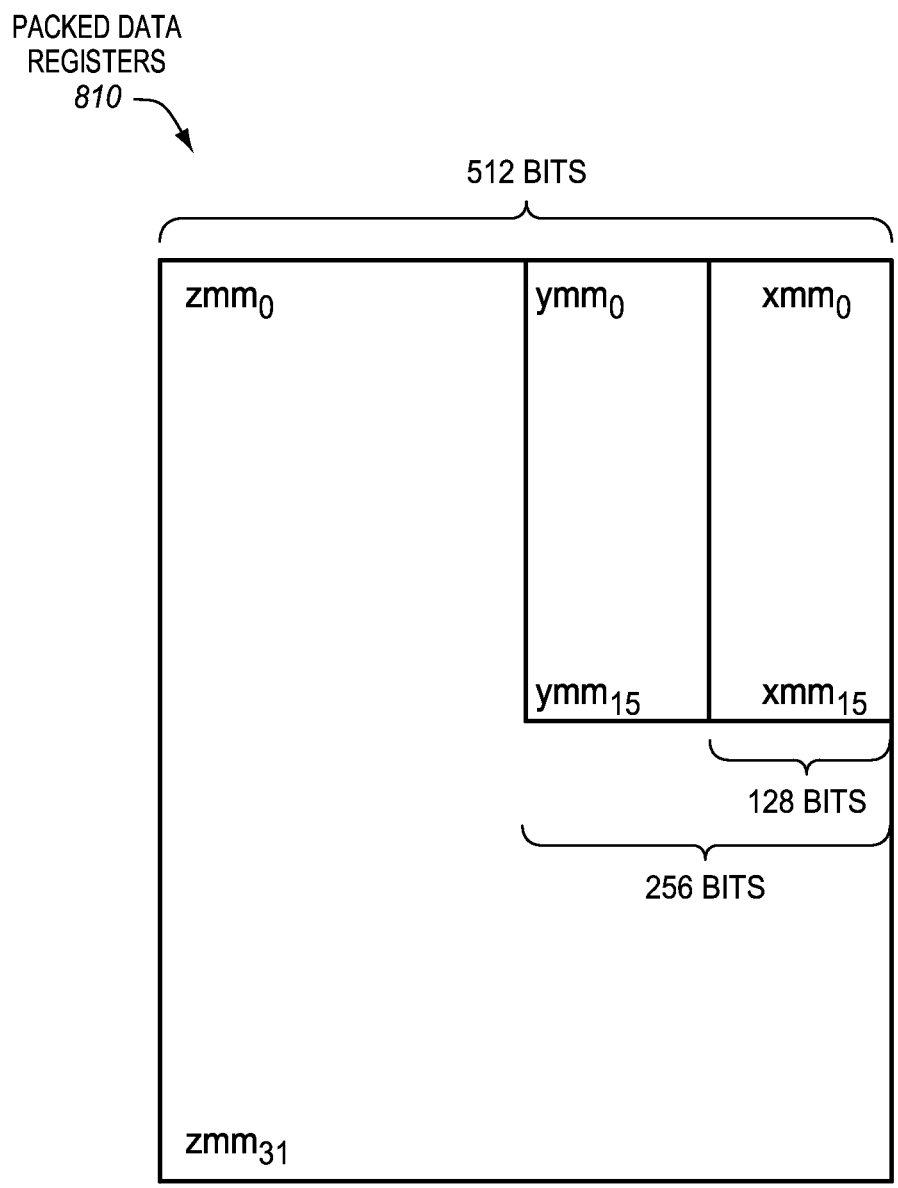
FIG. 8 is a block diagram of an example embodiment of a suitable set of packed data registers.

FIG. 8 is a block diagram of an example embodiment of a suitable set of packed data registers 810. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 9:
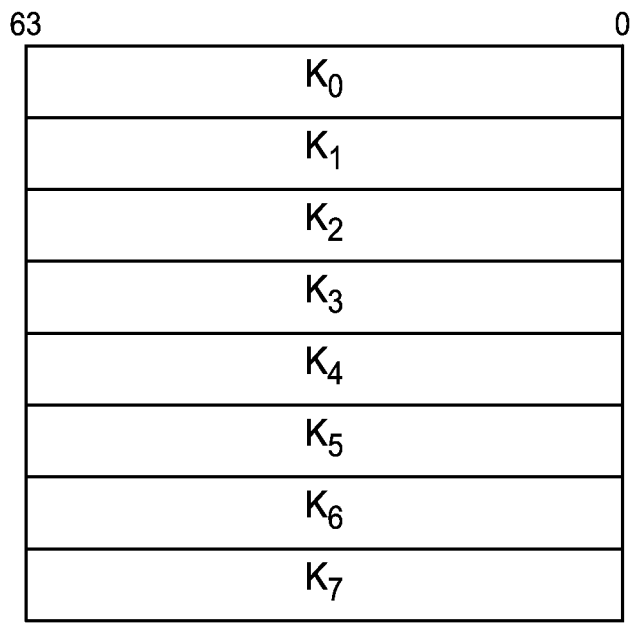
FIG. 9 is a block diagram of an example embodiment of a suitable set of packed data operation mask registers.

FIG. 9 is a block diagram of an example embodiment of a suitable set of packed data operation mask registers 918. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). Each of these registers may be used to store a packed data operation mask. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc.). The registers may be implemented in different ways using well known techniques and are not limited to any known particular type of circuit. Examples of suitable registers include, but are not limited to, dedicated physical registers, dynamically allocated physical registers using register renaming, and combinations thereof.

In some embodiments, the packed data operation mask registers 918 may be a separate, dedicated set of architectural registers that are dedicated primarily for predication (e.g., to predicate packed data operations at data element granularity). In some embodiments, the instructions may encode or specify the packed data operation mask registers in different bits or one or more different fields of an instruction format than those used to encode or specify other types of registers (e.g., packed data registers, general-purpose registers, etc.). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has a "no mask" encoding), although this is not required.

FIG. 10 is a diagram illustrating an example embodiment of a packed data operation mask register 1018 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits. In the illustrated embodiment, the lowest-order subset or portion of the register is used for masking, although this is not required. In alternate embodiments a highest-order subset, or some other subset, may optionally be used.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 12B:
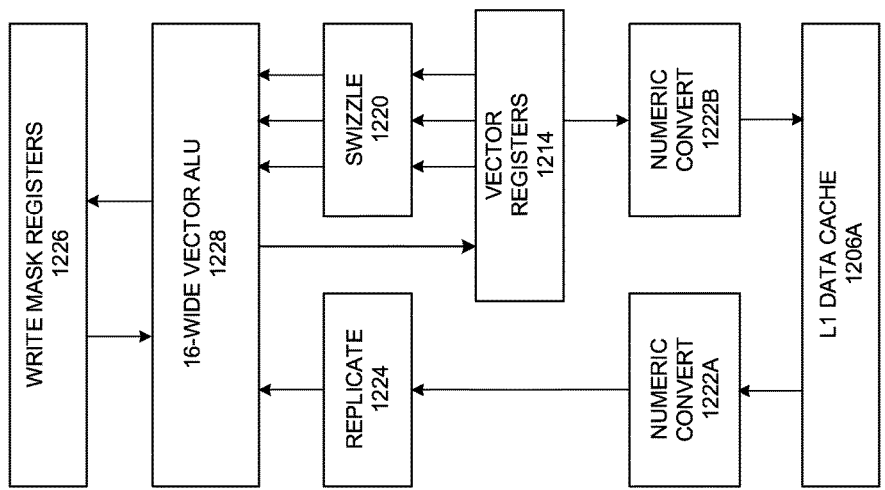
FIG. 12B is a block diagram of an embodiment of an expanded view of part of the processor core of FIG. 12A.
Figure 12A:
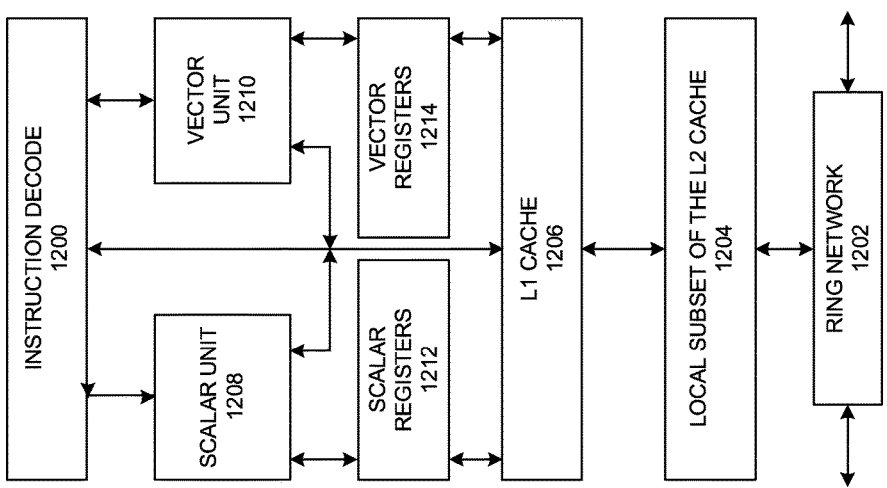
FIG. 12A is a block diagram of an embodiment of a single processor core, along with its connection to the on-die interconnect network, and with its local subset of the Level 2 (L2) cache.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Processor with Integrated Memory Controller and Graphics

Figure 13:
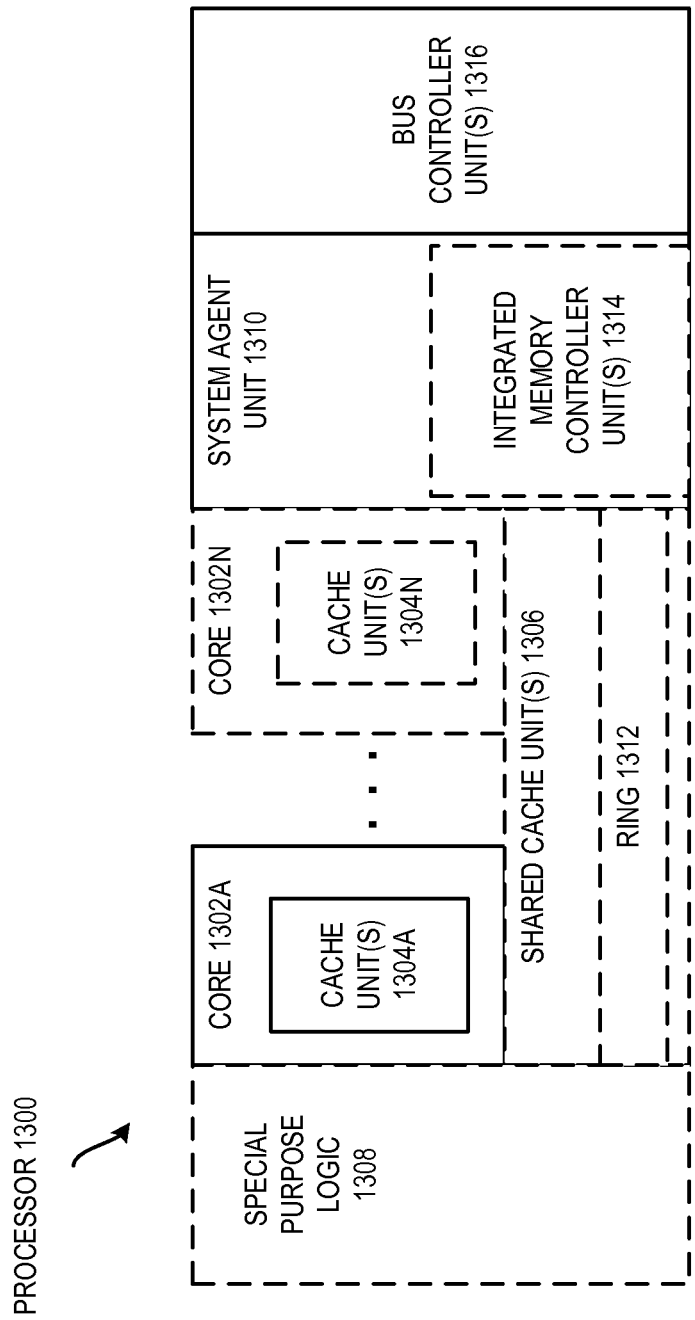
FIG. 13 is a block diagram of an embodiment of a processor that may have more than one core, may have an integrated memory controller, and may have integrated graphics.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
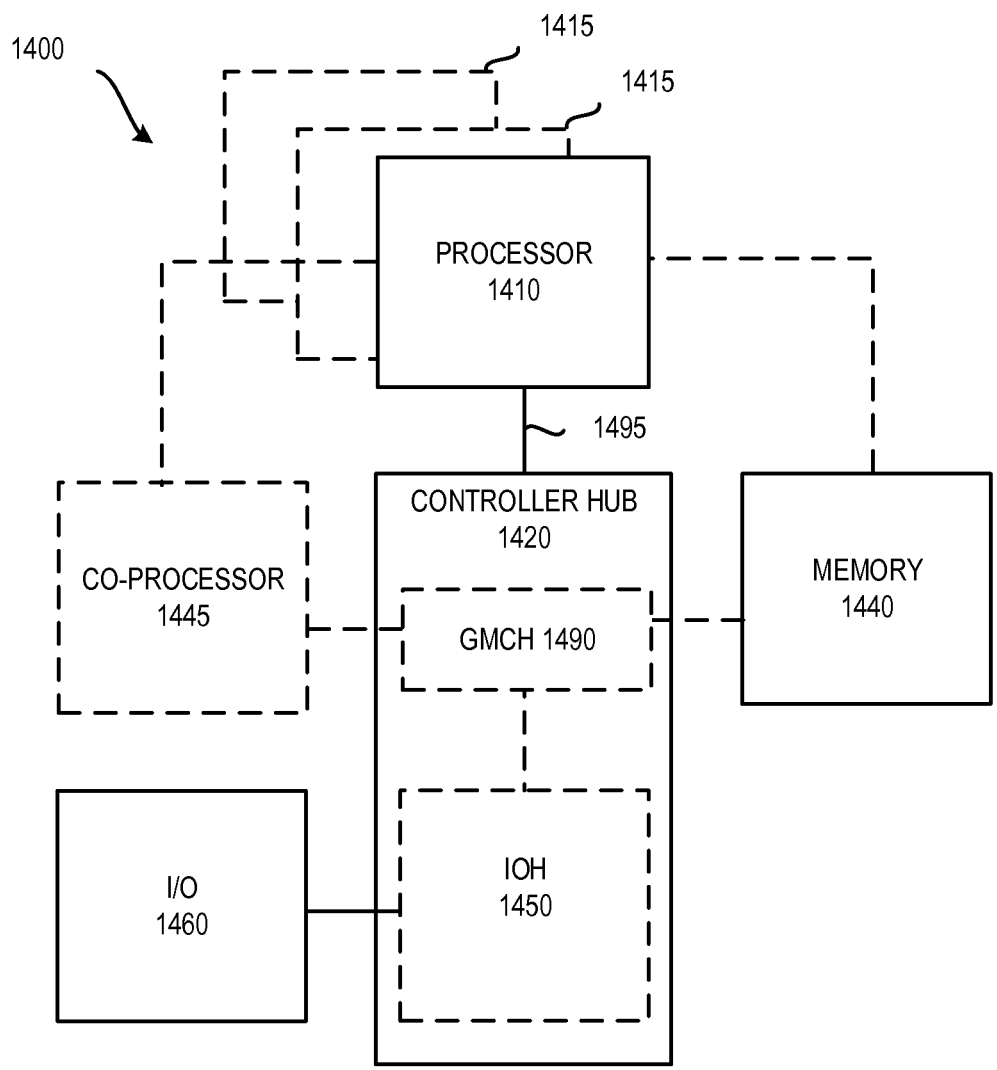
FIG. 14 is a block diagram of a first embodiment of a computer architecture.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
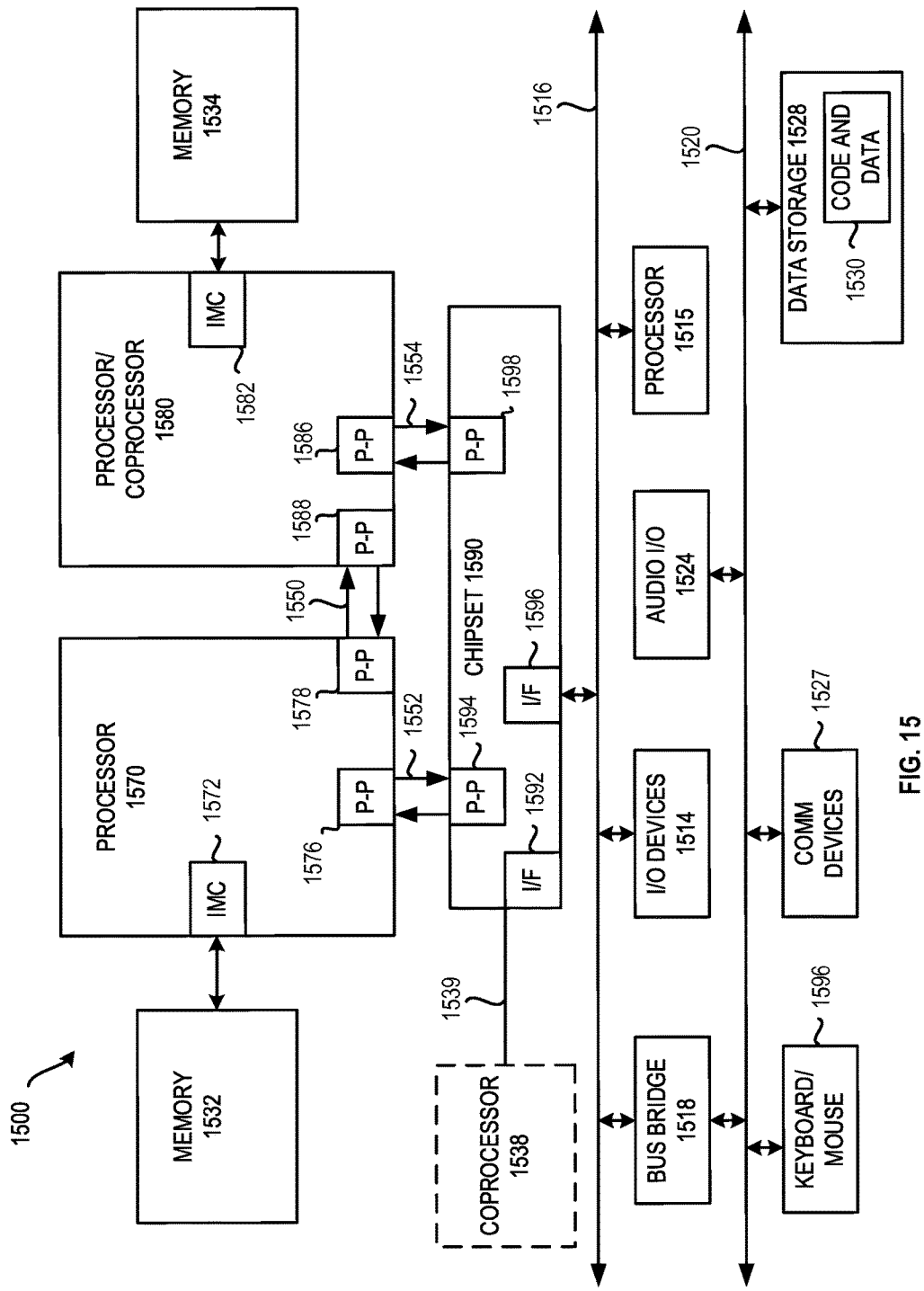
FIG. 15 is a block diagram of a second embodiment of a computer architecture.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
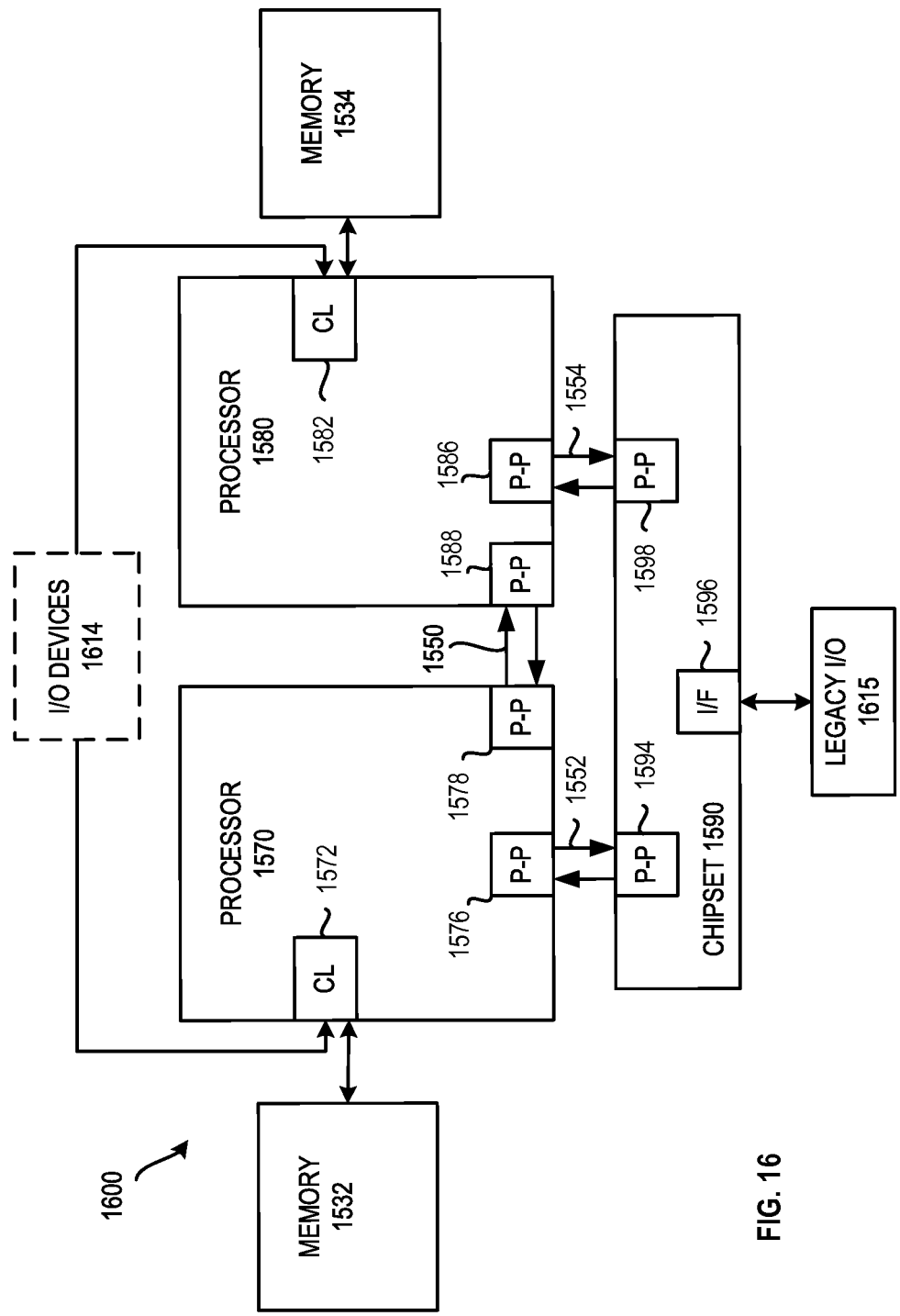
FIG. 16 is a block diagram of a third embodiment of a computer architecture.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
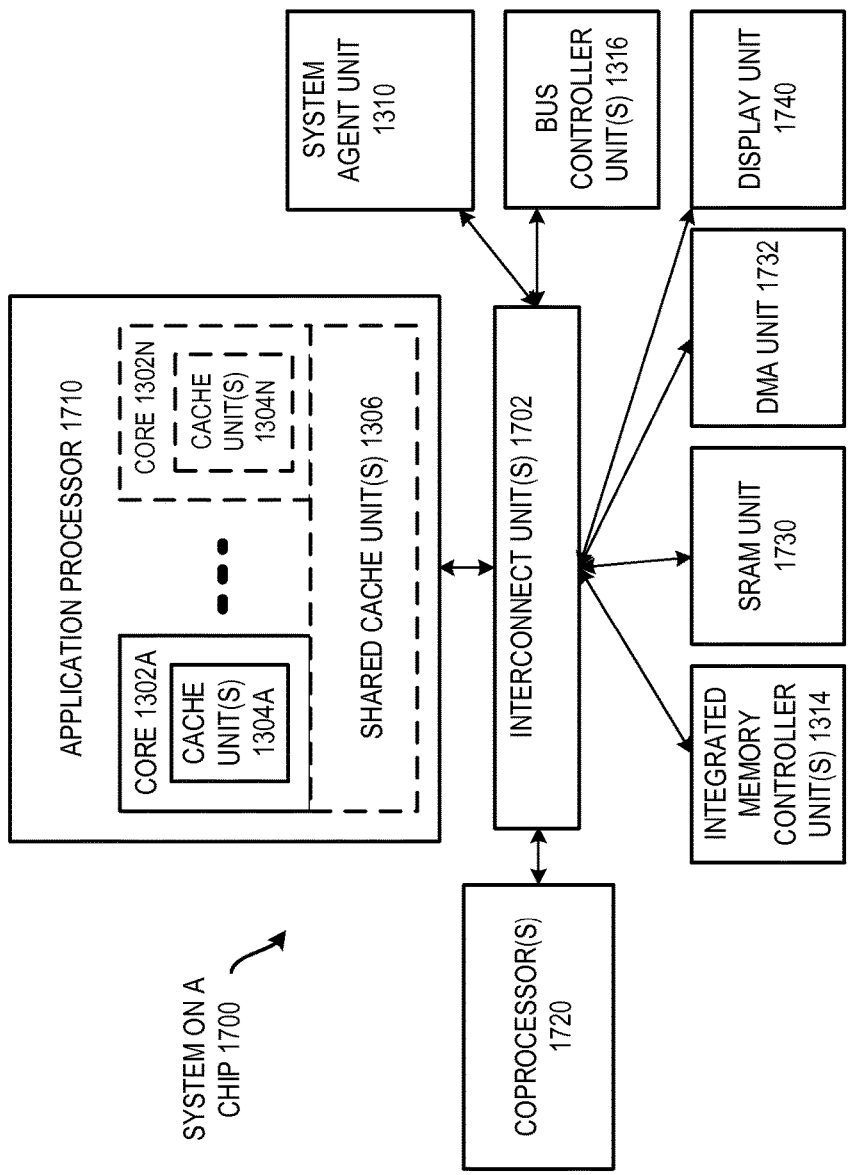
FIG. 17 is a block diagram of an embodiment of a system-on-a-chip architecture.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
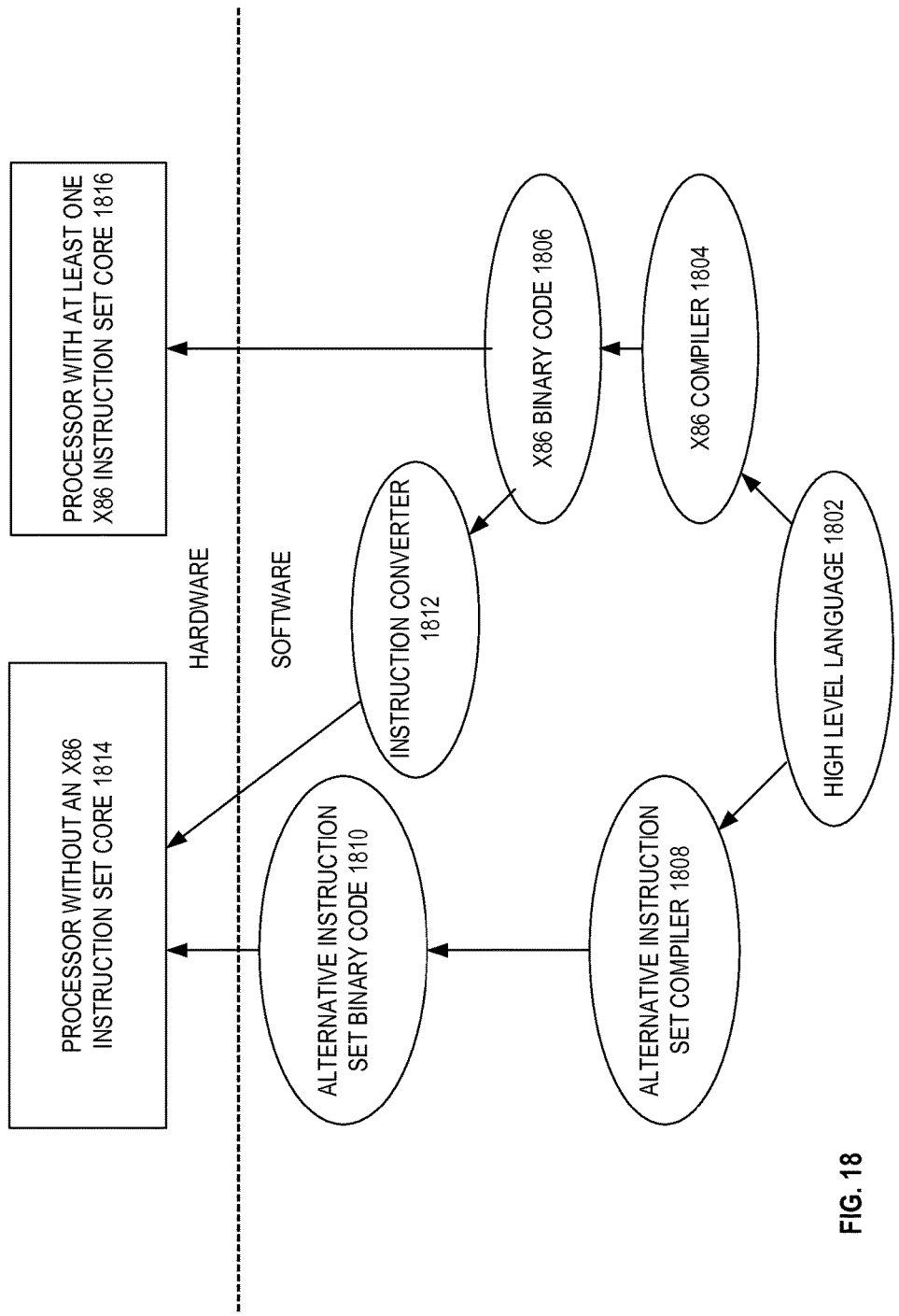
FIG. 18 is a block diagram of use of a software instruction converter to convert binary instructions in a source instruction set to binary instructions in a target instruction set, according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Components, features, and details described for any of FIGS. 3-10 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein. In one aspect, the systems may be employed as networking equipment, such as, for example, switches, routers, other network appliances (e.g., firewalls, sniffers, etc.), which may take advantage of the instructions disclosed herein for packet processing related activities, although the scope of the invention is not so limited. In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a plurality of packed data registers, and a decode unit to decode a data element selection and consolidation instruction. The data element selection and consolidation instruction is to have a first source packed data operand that is to have a plurality of data elements, and is to have a second source operand that is to have a plurality of mask elements. Each mask element of the second source operand is to correspond to a different data element of the first source packed data operand in a same relative position. The processor also includes an execution unit coupled with the decode unit. The execution unit, in response to the data element selection and consolidation instruction, is to store a result packed data operand in a destination storage location that is to be indicated by the data element selection and consolidation instruction. The result packed data operand is to include all data elements of the first source packed data operand, which correspond to unmasked mask elements of the second source operand, consolidated together in a portion of the result packed data operand.

Example 2 includes the processor of Example 1, in which the decode unit is to decode the instruction that is to have an immediate as the second source operand that is to have the mask elements, and in which the mask elements are mask bits.

Example 3 includes the processor of Example 1, in which the decode unit is to decode the instruction that is to have the second source operand which is to be a packed data operation mask register of a set of packed data operation mask registers of the processor. Also, optionally in which a plurality of other instructions of an instruction set of the processor specify registers of the set of packed data operation mask registers to provide predication operands.

Example 4 includes the processor of Example 1, in which the decode unit is to decode the instruction that is to have the second source operand that is to have the plurality of the mask elements which are mask bits.

Example 5 includes the processor of Example 1, in which the decode unit is to decode the instruction that is to have the second source operand which is to be a packed data operand, and in which the mask elements are to be mask data elements.

Example 6 includes the processor of Example 1, in which the execution unit, in response to the instruction, is to store the result packed data operand that is to include said all data elements consolidated together in a least significant portion of the result packed data operand and in a same order as in the first source packed data operand.

Example 7 includes the processor of Example 1, in which the execution unit, in response to the instruction, is to store the result packed data operand that is to include said all data elements consolidated together in a most significant portion of the result packed data operand and in a same order as in the first source packed data operand.

Example 8 includes the processor of Example 1, in which the execution unit, in response to the instruction, is to store the result packed data operand that is to have the consolidated data elements which are to omit all data elements of the first source packed data operand, which correspond to masked-out mask elements of the second source operand. Also, optionally in which the first source packed data operand is to have at least one data element that corresponds to a masked-out mask element between data elements that correspond to unmasked mask elements.

Example 9 includes the processor of any one of Examples 1 to 8, in which the decode unit is to decode the instruction that is to have one or more bits to indicate a size of the data elements of the first source packed data operand.

Example 10 includes the processor of any one of Examples 1 to 8, in which the decode unit is to decode the instruction that is to have the first source packed data operand that is to have a bit width of at least 128-bits and that is optionally to have a plurality of data elements selected from a plurality of 8-bit data elements and a plurality of 16-bit data elements. Also optionally in which the destination storage location includes a packed data register of the processor.

Example 11 includes the processor of any one of Examples 1 to 8, in which the decode unit is to decode the instruction that is to have an opcode that is to indicate that said all data elements of the first source packed data operand, which correspond to the unmasked mask elements of the second source operand, are to be consolidated together in the portion of the result packed data operand regardless of any particular arrangement of the data elements in the first source packed data operand, and regardless of any particular arrangement of the mask elements in the second source operand.

Example 12 includes the processor of any one of Examples 1 to 8, in which the processor includes a general-purpose processor. Also optionally in which the destination storage location includes a packed data register of the processor.

Example 13 is a method in a processor that includes receiving a data element selection and consolidation instruction. The data element selection and consolidation instruction has a first source packed data operand having a plurality of data elements, and has a second source operand having a plurality of mask elements. Each mask element of the second source operand corresponds to a different data element of the first source packed data operand in a same relative position. The method also includes storing a result packed data operand, in a destination storage location, in response to the data element selection and consolidation instruction. The destination storage location is indicated by the data element selection and consolidation instruction. The result packed data operand includes all data elements of the first source packed data operand, which correspond to unmasked mask elements of the second source operand, consolidated together in a portion of the result packed data operand.

Example 14 includes the method of Example 13, in which receiving includes receiving the instruction having an immediate as the second source operand that has the mask elements.

Example 15 includes the method of Example 13, in which receiving includes receiving the instruction having the second source operand which is a packed data operation mask register of a dedicated set of packed data operation mask registers used for predication.

Example 16 includes the method of Example 13, further including accessing the second source operand which has mask bits as the mask elements.

Example 17 includes the method of Example 13, in which receiving includes receiving the instruction having one or more bits to indicate a size of the data elements of the first source packed data operand.

Example 18 includes the method of Example 13, in which receiving includes receiving the instruction indicating the first source packed data operand which has at least 128-bits and optionally includes data elements that are one of 8-bit data elements and 16-bit data elements. Also optionally in which storing includes storing the result packed data operand having said all data elements consolidated together in a least significant portion of the result packed data operand and in a same order as they appear in the first source packed data operand.

Example 19 includes the method of Example 13, further including receiving a packet from a network, and storing a portion of the packet as the first source packed data operand. The method may also optionally include decoding a protocol of the packet, and optionally determining positions of flow bytes in the portion of the packet based on the decoding of the protocol of the packet. The method may also optionally include storing unmasked mask elements in the second source operand for each of the flow bytes and storing masked-out elements in the second source operand for other bytes in the portion of the packet.

Example 20 includes the method of Example 13, in which the first source packed data operand has data elements from a packet that has been received from a network. Optionally the method may also include performing a cryptographic operation on the consolidated data elements of the result packed data operand.

Example 21 is a system to process instructions including an interconnect, and a processor coupled with the interconnect. The processor is to receive a data element selection and consolidation instruction that is to have a first source packed data operand that is to have a plurality of data elements. The instruction is to have a second source operand that is to have a plurality of mask elements. Each mask element of the second source operand is to correspond to a different data element of the first source packed data operand in a same relative position. The instruction is also to indicate a destination storage location. The processor, in response to the instruction, is to store a result packed data operand in the destination storage location. The result packed data operand to include all data elements of the first source packed data operand, which correspond to unmasked mask elements of the second source operand, consolidated together in a portion of the result packed data operand. The system also includes a dynamic random access memory (DRAM) coupled with the interconnect. The DRAM storing a set of protocol decode instructions, the set of instructions, when executed by the processor, to cause the processor to perform operations including decoding a protocol of a first network packet, and generating the second source operand to unmask flow elements in at least a portion of a header of a second network packet which is stored in the first source packed data operand and to mask non-flow elements.

Example 22 includes the system of Example 21, in which the second source operand includes an immediate.

Example 23 is an article of manufacture including a non-transitory machine-readable storage medium. The non-transitory machine-readable storage medium storing a data element selection and consolidation instruction. The instruction to have a first source packed data operand that is to have a plurality of data elements, and to have a second source operand that is to have a plurality of mask elements. Each mask element of the second source operand is to correspond to a different data element of the first source packed data operand in a same relative position. The instruction is to indicate a destination storage location. The instruction if executed by a machine is to cause the machine to perform operations including storing a result packed data operand, in the destination storage location. The result packed data operand is to include all data elements of the first source packed data operand, which correspond to unmasked mask elements of the second source operand, consolidated together in a portion of the result packed data operand.

Example 24 includes the article of manufacture of Example 23, in which the second source operand is a packed data operation mask register of a dedicated set of packed data operation mask registers used for predication.

Example 25 is a processor or other apparatus that is operative to perform the method of any one of Examples 13 to 20.

Example 26 is a processor or other apparatus that includes means for performing the method of any one of Examples 13 to 20.

Example 27 is a processor or other apparatus that includes modules to perform the method of any one of Examples 13 to 20.

Example 28 is a processor that includes any combination of modules and/or units and/or logic and/or circuitry and/or means for performing the method of any one of Examples 13 to 20.

Example 29 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 13 to 20.

Example 30 is a computer system, other electronic device, or other apparatus including a bus or other interconnect, the processor of any one of Examples 1 to 12 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 31 is a processor or other apparatus substantially as described herein.

Example 32 is a processor or other apparatus that is operative to perform any method substantially as described herein.

Example 33 is a processor or other apparatus that is operative to perform any data element select and compact instruction substantially as described herein.

Example 34 is a processor or other apparatus including a decode unit to decode instructions of a first instruction set. The decode unit is to receive one or more instructions of the first instruction set that emulate a first instruction. The first instruction may be any data element select and compact instruction substantially as disclosed herein, and is to be of a second different instruction set. The processor or other apparatus also includes one or more execution units coupled with the decode unit to execute the one or more instructions of the first instruction set. The one or more execution units, in response to the one or more instructions of the first instruction set, are to store a result in a destination. The result may include any result of a data element select and compact instruction substantially as disclosed herein.

Example 35 is a computer system or other electronic device that includes a processor having a decode unit to decode instructions of a first instruction set. The processor also has one or more execution units. The electronic device also includes a storage device coupled with the processor. The storage device is to store a first instruction, which may be any data element select and compact instruction substantially as disclosed herein, and which is to be of a second different instruction set. The storage device is also to store instructions to convert the first instruction into one or more instructions of the first instruction set. The one or more instructions of the first instruction set, when performed by the processor, are to cause the processor to store a result in a destination. The result may include any result of a data element select and compact instruction substantially as disclosed herein.

What is claimed is:

1. A processor comprising:
   a plurality of packed data registers;
   a decode unit to decode a data element selection and consolidation instruction, the data element selection and consolidation instruction to indicate a first source packed data operand that is to have a plurality of data elements, and the data element selection and consolidation instruction to indicate a second source operand that is to have a plurality of mask elements, wherein each mask element of the second source operand corresponds to a different data element of the first source packed data operand in a same relative position, and the data element selection and consolidation instruction to indicate a general-purpose register; and
   an execution unit coupled with the decode unit, the execution unit, in response to the data element selection and consolidation instruction, to store a result packed data operand in a destination storage location that is to be indicated by the data element selection and consolidation instruction, the result packed data operand to include all data elements of the first source packed data operand, which correspond to unmasked mask elements of the second source operand, consolidated together in a least significant portion of the result packed data operand, wherein to use the least significant portion to store said all data elements is to be fixed for an opcode of the data element selection and consolidation instruction, and
   the execution unit, in response to the data element selection and consolidation instruction, to store a value indicative of a number of said all data elements of the first source packed data operand that are said consolidated together in the general-purpose register.

2. The processor of claim 1, wherein the decode unit is to decode the instruction that is to have an immediate as the second source operand that is to have the mask elements, and wherein the mask elements are mask bits.

3. The processor of claim 1, wherein the decode unit is to decode the instruction that is to have the second source operand which is to be a packed data operation mask register of a set of packed data operation mask registers of the processor, wherein a plurality of other instructions of an instruction set of the processor specify registers of the set of packed data operation mask registers to provide predication operands.

4. The processor of claim 1, wherein the decode unit is to decode the instruction that is to have the second source operand that is to have the plurality of the mask elements which are mask bits.

5. The processor of claim 1, wherein the decode unit is to decode the instruction that is to have the second source operand which is to be a packed data operand, and wherein the mask elements are to be mask data elements.

6. The processor of claim 1, wherein the execution unit, in response to the instruction, is to store the result packed data operand that is to include said all data elements consolidated together in the least significant portion of the result packed data operand and in a same order as in the first source packed data operand.

7. The processor of claim 1, wherein the execution unit, in response to the instruction, is to store the result packed data operand that is to have the consolidated data elements which are to omit all data elements of the first source packed data operand, which correspond to masked-out mask elements of the second source operand, and wherein the first source packed data operand is to have at least one data element that corresponds to a masked-out mask element between data elements that correspond to unmasked mask elements.

8. The processor of claim 1, wherein the decode unit is to decode the instruction that is to have one or more bits to indicate a size of the data elements of the first source packed data operand.

9. The processor of claim 1, wherein the decode unit is to decode the instruction that is to have the first source packed data operand that is to have a bit width of at least 128-bits and that is to have a plurality of data elements selected from a plurality of 8-bit data elements and a plurality of 16-bit data elements, and wherein the destination storage location comprises a packed data register of the processor.

10. The processor of claim 1, wherein the decode unit is to decode the instruction that is to have the opcode that is to indicate that said all data elements of the first source packed data operand, which correspond to the unmasked mask elements of the second source operand, are to be said consolidated together in the least significant portion of the result packed data operand regardless of any particular arrangement of the data elements in the first source packed data operand, and regardless of any particular arrangement of the mask elements in the second source operand.

11. The processor of claim 1, wherein the processor comprises a general-purpose processor, and wherein the destination storage location comprises a packed data register of the processor.

12. The processor of claim 1, wherein the second source operand is to be stored in an architectural mask register that has at least 64-bits, and wherein the second source operand has less than 64-bits.

13. A method in a processor comprising:
receiving a data element selection and consolidation instruction, the data element selection and consolidation instruction having a first source packed data operand having a plurality of data elements, and the data element selection and consolidation instruction having a second source operand having a plurality of mask elements, each mask element of the second source operand corresponding to a different data element of the first source packed data operand in a same relative position, and the data element selection and consolidation instruction indicating a general-purpose register; and
storing a result packed data operand, in a destination storage location, in response to the data element selection and consolidation instruction, the destination storage location indicated by the data element selection and consolidation instruction, the result packed data operand including all data elements of the first source packed data operand, which correspond to unmasked mask elements of the second source operand, consolidated together in a least significant portion of the result packed data operand, wherein using the least significant portion to store said all data elements is fixed for an opcode of the data element selection and consolidation instruction; and
storing a value indicative of a number of said all data elements of the first source packed data operand that are said consolidated together in the general-purpose register.

14. The method of claim 13, wherein receiving comprises receiving the instruction having an immediate as the second source operand that has the mask elements.

15. The method of claim 13, wherein receiving comprises receiving the instruction having the second source operand which is a packed data operation mask register of a dedicated set of packed data operation mask registers used for predication.

16. The method of claim 13, further comprising accessing the second source operand which has mask bits as the mask elements.

17. The method of claim 13, wherein receiving comprises receiving the instruction having one or more bits to indicate a size of the data elements of the first source packed data operand.

18. The method of claim 13, wherein receiving comprises receiving the instruction indicating the first source packed data operand which has at least 128-bits and includes data elements that are one of 8-bit data elements and 16-bit data elements, and wherein storing comprises storing the result packed data operand having said all data elements consolidated together in the least significant portion of the result packed data operand and in a same order as they appear in the first source packed data operand.

19. The method of claim 13, wherein the first source packed data operand has data elements from a packet that has been received from a network, and further comprising performing a cryptographic operation on the consolidated data elements of the result packed data operand.

20. An article of manufacture comprising a non-transitory machine-readable storage medium, the non-transitory machine-readable storage medium storing instructions including a data element selection and consolidation instruction,
the instruction to indicate a first source packed data operand that is to have a plurality of data elements, to have a second source operand that is to indicate a plurality of mask elements, each mask element of the second source operand to correspond to a different data element of the first source packed data operand in a same relative position, the instruction to indicate a general-purpose register, and the instruction to indicate a destination storage location, and the instruction if executed by a machine is to cause the machine to perform operations comprising to:

store a result packed data operand, in the destination storage location, the result packed data operand to include all data elements of the first source packed data operand, which correspond to unmasked mask elements of the second source operand, consolidated together in a least significant portion of the result packed data operand, wherein to use the least significant portion to store said all data elements is to be fixed for an opcode of the data element selection and consolidation instruction; and store a value indicative of a number of said all data elements of the first source packed data operand that are said consolidated together in the general-purpose register.

21. The article of manufacture of claim 20, wherein the second source operand is a packed data operation mask register of a dedicated set of packed data operation mask registers used for predication.

* * * * *